(12) United States Patent
Paltashev et al.

(10) Patent No.: US 8,082,426 B2
(45) Date of Patent: Dec. 20, 2011

(54) SUPPORT OF A PLURALITY OF GRAPHIC PROCESSING UNITS

(75) Inventors: Timour Paltashev, Fremont, CA (US); Boris Prokopenko, Milpitas, CA (US); John Brothers, Sunnyvale, CA (US)

(73) Assignee: Via Technologies, Inc., Taipei (TW)

( * ) Notice: Subject to any disclaimer, the term of this patent is extended or adjusted under 35 U.S.C. 154(b) by 484 days.

(21) Appl. No.: 12/266,078

(22) Filed: Nov. 6, 2008

(65) Prior Publication Data
US 2010/0115249 A1 May 6, 2010

(51) Int. Cl.
*G06F 9/46* (2006.01)
(52) U.S. Cl. .................................................. 712/228
(58) Field of Classification Search ................... None
See application file for complete search history.

(56) References Cited

U.S. PATENT DOCUMENTS

| | | | | |
|---|---|---|---|---|
| 5,299,309 A * | 3/1994 | Kuo et al. | ...................... | 345/541 |
| 5,428,779 A * | 6/1995 | Allegrucci et al. | ............ | 718/108 |
| 5,430,841 A * | 7/1995 | Tannenbaum et al. | ........ | 345/502 |
| 5,559,988 A * | 9/1996 | Durante et al. | ................ | 711/152 |
| 6,263,115 B1 * | 7/2001 | Cho | ............................. | 382/243 |
| 6,782,432 B1 * | 8/2004 | Nelson et al. | ...................... | 710/1 |
| 7,007,151 B1 * | 2/2006 | Ely et al. | ........................ | 711/202 |
| 7,320,063 B1 * | 1/2008 | Grohoski et al. | ............. | 712/214 |
| 7,444,641 B1 * | 10/2008 | Diepstraten et al. | .......... | 718/107 |
| 2003/0142037 A1 * | 7/2003 | Pinedo et al. | .................... | 345/1.1 |
| 2004/0187122 A1 * | 9/2004 | Gosalia et al. | ................ | 718/100 |
| 2004/0193693 A1 * | 9/2004 | Gangwal et al. | ............... | 709/213 |
| 2005/0289551 A1 * | 12/2005 | Wojtkiewicz et al. | ........ | 718/103 |
| 2006/0146864 A1 * | 7/2006 | Rosenbluth et al. | .......... | 370/458 |
| 2006/0168374 A1 * | 7/2006 | Wray et al. | ..................... | 710/62 |
| 2006/0168428 A1 * | 7/2006 | Alsup | ........................... | 712/228 |

\* cited by examiner

*Primary Examiner* — Eric Coleman
(74) *Attorney, Agent, or Firm* — Thomas, Kayden, Horstemeyer & Risley, LLP

(57) ABSTRACT

Included are systems and methods for supporting a plurality of Graphics Processing Units (GPUs). At least one embodiment of a system includes a context status register configured to send data related to a status of at least one context and a context switch configuration register configured to send instructions related to at least one event for the at least one context. At least one embodiment of a system includes a context status management component coupled to the context status register and the context switch configuration register.

13 Claims, 18 Drawing Sheets

SUPPORT OF A PLURALITY OF GRAPHIC PROCESSING UNITS

CROSS REFERENCE TO RELATED APPLICATIONS

This application is related to copending U.S. Utility Patent Application entitled "Multiple GPU Context Synchronization Using Barrier Type Primitives" filed on the same day as the present application and accorded Ser. No. 12/266,115, which is hereby incorporated by reference herein in its entirety. This application also incorporates by reference U.S. application Ser. No. 12/266,034, entitled "Metaprocessor for GPU Control and Synchronization in a Multiprocessor Environment" in its entirety.

BACKGROUND

As computer generated graphics have evolved, the demand for processing capabilities has increased. While a single central processing unit (CPU) has historically been utilized to process instructions for rendering graphics, many graphics applications can be better realized with additional hardware. More specifically, as graphics demands have increased, the use of multiple CPUs, and/or a graphics processing unit (GPU) have been utilized. The introduction of a GPU into a computer has helped streamline the processing of graphics instructions. While the introduction of a GPU has increased graphics capabilities, many dynamic graphics scenes are more suitably rendered with the utilization of a plurality of GPUs. In introducing more than one GPU into a computing environment, synchronization of the GPUs may be desirable.

Software-based multiple CPU synchronization mechanisms have been well developed over the last 15 years. Because of the nature of recently developed GPUs, which have a stream type architecture, the existing multiple CPU synchronization support lacks many desirable characteristics in both software and hardware.

Introduction of PCI-Express system interface can provide a generic message transport level for communication between multiple CPUs and/or GPUs in the computer system as well as coherency support between data blocks in main and local memories. While PCI-Express locked transaction support messages and vendor defined messages can be used as low level primitives for implementation of different synchronization types, this mechanism does not contain necessary GPU synchronization support and vendors may be forced to define their messages to support multi-CPU and multi-GPU configurations of the system.

Additionally, barrier type synchronization is widely used in multithreaded and multiprocessor systems but current implementations of barrier synchronization in single context GPU may cause significant stalls and potential deadlocks, which may lead to inefficient use of GPUs in computer systems.

Thus, a heretofore unaddressed need exists in the industry to address the aforementioned deficiencies and inadequacies.

SUMMARY

Included are systems and methods for supporting a plurality of Graphics Processing Units (GPUs). At least one embodiment of a system includes a context status register configured to send data related to a status of at least one context and a context switch configuration register configured to send instructions related to at least one event for the at least one context. At least one embodiment of a system includes a context status management component coupled to the context status register and the context switch configuration register.

Also included are embodiments of a method for supporting a plurality of Graphics Processing Units (GPUs). At least one embodiment of a method includes detecting an event related to a context, stopping execution of a current context setting a status of the current context to a pending save status, and switching to a new context using a definition register.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
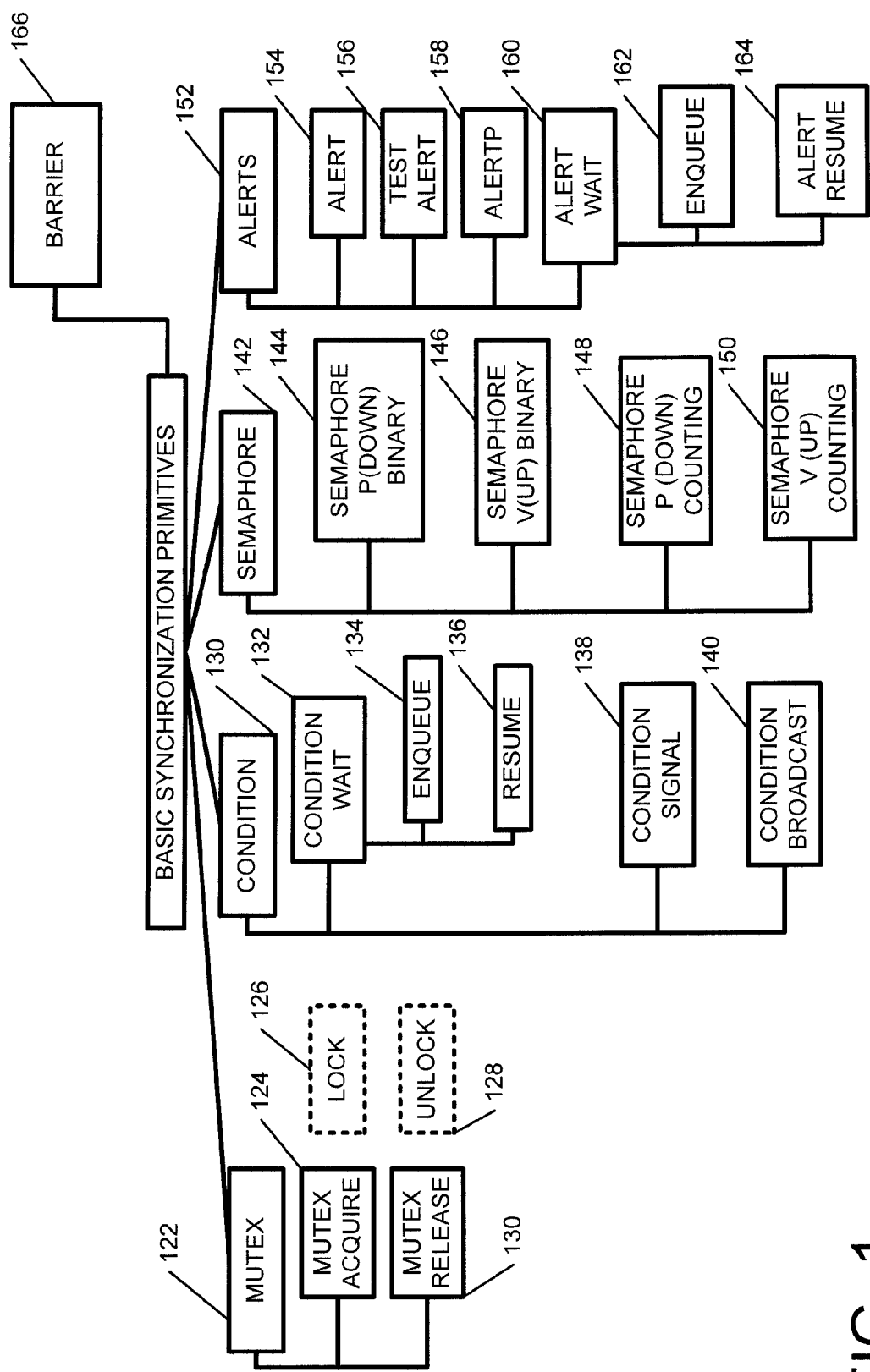
FIG. 1 is a block diagram illustrating basic synchronization primitives used in multiple threads/multiple GPU environment.

FIG. 1 is a block diagram illustrating basic synchronization primitives used in multiple threads/multiple GPU environment. As illustrated, some of the basic synchronization primitives that may be utilized to synchronize CPUs include mutex primitive group 122 (indicating mutual exclusive commands), condition primitive group 130, semaphore primitive group 142, and alerts primitive group 152. Mutex primitive group 122 may include a "mutex acquire" 124 and a "mutex release" 130 primitives. Lock 126 and unlock 128 primitives are also included as different names for mutex primitives.

In the condition group 130 is a condition wait primitive 132, which includes an enqueue 134 and a resume 136 variations. An enqueue variation 134 of condition wait 132 suspends current thread and put it in the queue if condition predicate is not true (not satisfied). A resume variation 136 of condition wait may resume thread execution if condition predicate is true (satisfied). A condition signal primitive 138 is also included in the condition group, as well as a condition broadcast primitive 140. The primitives may be similar in their actions and may call for wake-up of wait-suspended (enqueued) threads to check the condition predicate one more time and proceed if the condition predicate is still true. The condition signal primitive may inform about a condition predicate change related to one or more suspended threads. Condition broadcast primitive informs suspended threads. Semaphore group 142 contains a semaphore P (down) binary primitive 144, a semaphore V(up) binary primitive 146, a semaphore P(down) counting primitive 148, and a semaphore V(up) counting primitive 150. Binary semaphores may operate similarly as mutex primitives, binary semaphore P may be associated with acquire and binary semaphore V with release. Counting semaphore P (down) 148 checks semaphore value, decrements the semaphore value, and proceeds the thread execution if the value is not zero. Otherwise, counting semaphore P (down) 148 does not complete down part of operation and goes to sleep. Counting semaphore V (up) 150 increments semaphore value and wake ups any thread in sleeping stage unable to finish down part of semaphore P operation on semaphore with this particular address. Semaphores 142 may be useful in cases of interaction with interrupt routines because they cannot use mutexes. Alerts 125 provide soft form of interrupt of thread execution in conjunction with both semaphores 142 and condition primitives 130, to implement events such as timeouts and aborts. Alerts may be used in situations where decisions to make this request occur at an abstraction level higher than that in which a thread is blocked. Alerts group 152 includes an alert primitive 154, a test alert primitive 156, an alert P primitive 158, and an alert wait primitive 160. Alert wait primitive 160 may have a plurality of variations, including but not limited to an enqueue primitive 162 and an alert resume primitive 164.

Calling Alert(t) 158 is a request that the thread raise the exception Alerted 154. The procedure TestAlert 156 can be configured to allow a thread to determine whether there is a pending request for the thread to raise Alerted 154. AlertWait is similar to Wait, except that AlertWait may raise Alerted 154 rather than returning. The choice between AlertWait 160 and Wait depends on whether or not the calling thread is to respond to an Alert at the point of the call. The procedure AlertP provides the analogous facility for semaphores.

An additional synchronization operation in programs with parallel loops is a barrier 166. A barrier 166 can be configured to hold the processes from continuing until all (or a plurality) of the processes reach the barrier 166. Once the desired processes have reached the barrier 166, the barrier 166 can release the processes. At least one implementation of a barrier 166 can be utilized with a plurality of spin locks. The spin locks may include a first spin lock that may be used to protect a counter that tallies the processes arriving at the barrier 166 and a second spin lock that may be used to hold the processes until the last process arrives at the barrier 166. An alternative solution is a sense-reversing barrier, which can be configured to make use of a private preprocess variable, which can be initialized to "1" for each process.

While the discussion above is directed to software primitives and CPU synchronization hardware support, below this disclosure also focuses on implementation and hardware support of barrier-like primitives that can be configured to efficiently facilitate GPU synchronization. More specifically, this disclosure includes discussions of GPU hardware synchronization primitives, as well as hardware blocks that may be configured to implement those primitives to support context-to context and GPU-to-GPU synchronization.

GPU Internal Pipeline and External CPU Synchronization Primitives

In some GPUs, a synchronization mechanism may include a plurality of GPU commands, a fence command, and a wait command implementing internal GPU pipeline barrier type synchronization. The fence command can write a value to a memory mapped fence register (internal) and/or to a memory location (external). This can be similar to setting up a barrier 166, as discussed above. A wait command can be implemented in a plurality of different ways, which may be external and/or internal relative to the GPU.

An external wait command can be configured to check a specified memory location containing a counter value. If the value is not zero, a command may decrement the value and continue to execute current context. If the value is equal to zero, a PC counter (and/or GPU command pointer) may be reset to the value preceding wait command and the GPU may switch to another context.

An internal wait command can be configured to write a certain value to a virtual wait register. The write can be completed when the fence value residing in a paired register matches or more than value supplied by the wait command. Special compare logic can be associated with the pairs of fence-wait registers. This command can be associated with spinlock because GPU hardware may be checking the content of the fence register until the content is updated to a desired value and block at this moment in the GPU pipeline execution.

In case of data mismatch, the wait command can be configured to stall the GPU pipeline and continue to execute a wait command in the following clock cycles. The fence value can come from preceding commands in pipeline and may reach a sync register pair any time. When the fence register is updated and the value matches or exceeds the wait value, the wait command write is finished and pipeline is unblocked. One should also note that such set of synchronization fence/wait registers can be also mapped to memory but it may create memory contention while spinning in attempt of wait value writing.

One should note that a GPU context may be compared with CPU thread, which represents certain part of application task. A run list or group of contexts is comparable with CPU process containing several threads. Additionally, in many systems, threads can be synchronized with each other. A synchronization mechanism can be utilized with any thread scheduling approach and hardware may be connected to scheduling software and/or hardware. Such a thread synchronization mechanism for CPU domain which includes several synchronization primitives is included in "Synchronization Primitives for a Multiprocessor: A Formal Specification", A. D. Birrell, J. V. Guttag, J. J. Horning, R. Levin, Aug. 20, 1987, SRC Research Report 20, which is hereby incorporated by reference in its entirety.

Figure 2:
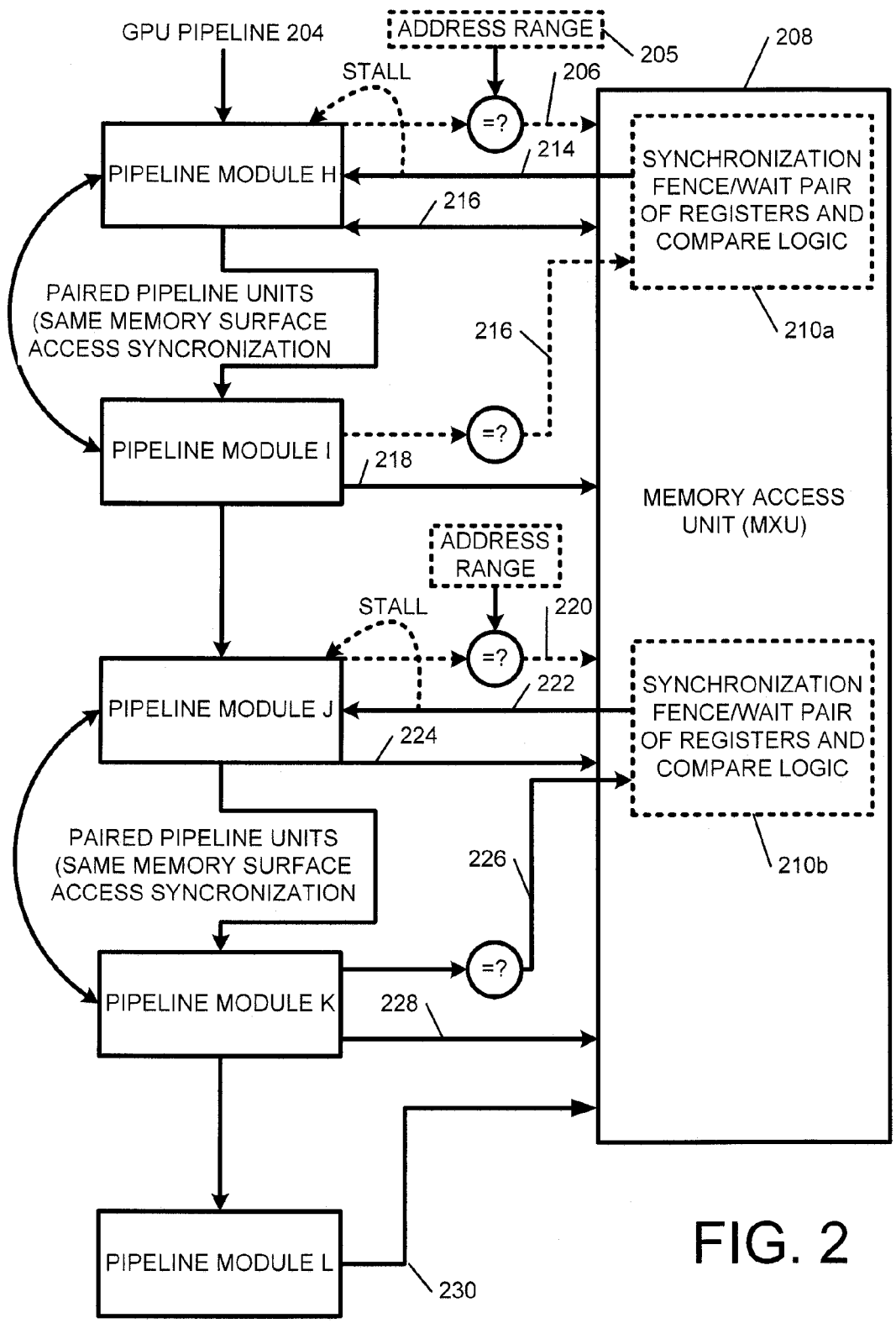
FIG. 2 is a diagram illustrating a nonlimiting example of an internal barrier synchronization implementation in GPU pipeline.

FIG. 2 is a block diagram illustrating an embodiment of internal fence/wait interaction in a GPU pipeline. More specifically, GPU pipeline 204 includes a plurality of modules to illustrate various points of the pipeline. The pipeline module H, can be configured to send an internal wait token 206 to memory access unit 208. Register 210a mapped to the memory space can be configured to send a write confirmation 214 to pipeline module H, thereby creating a memory data read/write path 216. Register 210a sends a write confirmation only in the case if wait token value is equal or exceeds fence value contained in paired fence register which could be sent by another pipeline block located in deeper stage of pipeline.

Similarly, pipeline module I can be configured to send an internal fence token 216 to register 210a (which can include a pair of Fence/wait registers). Upon the register receiving the internal fence token 216, a memory data write path 218 can be created. As also indicated in FIG. 2, pipeline module H and pipeline module I are paired pipeline units that can be configured to synchronize module H activity with certain operations of module I (for example, the same memory surface access synchronization).

As pipeline module H and pipeline module I perform certain actions with register 210a, another pipeline module J can be also configured to send an internal wait token 220 to memory access unit 208. Register 210b (which can include a pair of registers) can then send a write confirmation 222 back to pipeline module J, which can facilitate the creation of a memory data write path 224. Pipeline module M can send an internal fence token 226 to register 210b and can then create a memory data write path 228. Pipeline module can create a memory data write path 230. Each pair of such registers can be associated with memory address of synchronization data block and mapped address range of each pair is provided in special address range register 205, which can be used to detect a hit to register pair of executed fence or wait command. If an address in a fence or wait command does not match the address range fence or wait, data may be redirected to external memory.

One should note that while five pipeline modules are illustrated in FIG. 2, this is a nonlimiting example. As one of ordinary skill in the art will understand, any number of pipeline modules can be configured to provide the desired functionality and it depends on number of paired fence wait registers with associated logic implemented in memory access unit. Additionally, while in at least one embodiment memory access unit can include 208 16-32 pairs of registers, this is also a nonlimiting example. As one of ordinary skill in the art will understand, any number of register pairs may be utilized, depending on the particular configuration of graphics pipeline.

Additionally, depending on the particular configuration, not every block of GPU pipeline 204 needs to be configured to handle fence/wait command and only the units that are configured to write data out to the memory access unit 208 can have special fence/wait interface to memory interface unit 208.

Figure 3:
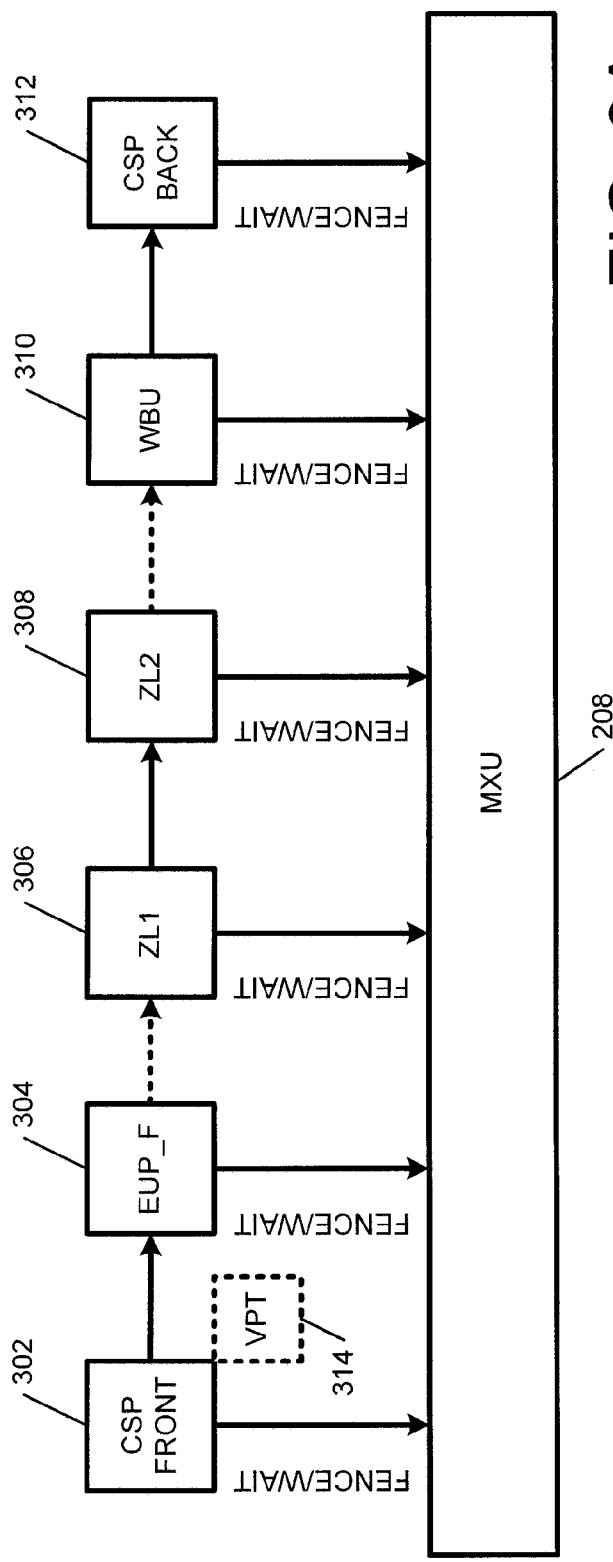
FIG. 3A is another embodiment of a GPU internal barrier synchronization implementation.
FIG. 3B is exemplary format of a GPU barrier command.

FIG. 3A is a block diagram of an embodiment of a GPU pipeline, similar to the GPU pipeline from FIG. 2. More specifically, the nonlimiting example of FIG. 3A includes memory interface unit 208 and a plurality of pipeline modules 302, 304, 306, 303, 310, and 312. Also included is a Virtual Page Table (VPT) module 314. As one of ordinary skill in the art will understand, while six pipeline modules are illustrated in FIG. 3A, this is a nonlimiting example. Depending on the particular configuration, more or less pipeline modules may be utilized. As a nonlimiting example, pipeline configured to use fence/wait pairs may include front-end part of command stream processor 302. The front-end party may be connected to a front-end execution unit pool EUP_F 304, which may process vertices. The front-end execution unit pool EUP_F 304 may also be configured to process, send, and/or receive data with other pipeline units which may include early depth test unit ZL1, ZL2, and write-back unit WBU processing final pixel values and back-end part of Command Stream processor 312. These units may be electrically connected to memory interface unit MXU 208 and can be paired in described above synchronization procedure.

Additionally, a GPU command token "Internal Sync" can be created and dedicated to support synchronization primitives, as illustrated in FIG. 3B. Depending on certain bit values in opcode 314, the Internal Sync command token may have variations providing a plurality of versions of external fence, internal fence and wait. Internal sync command tokens may be inserted to the command stream fetched by CSP. The Internal Sync command can be sent from the front-end CSP 302 to a particular unit from a group having interface with memory exchange unit 208. If a fence is external to the memory exchange unit 208, the fence can write a value to memory location defined in the command. There is generally no external wait supported in this command because the command may create memory contention and require mutex implementation.

Figure 4:
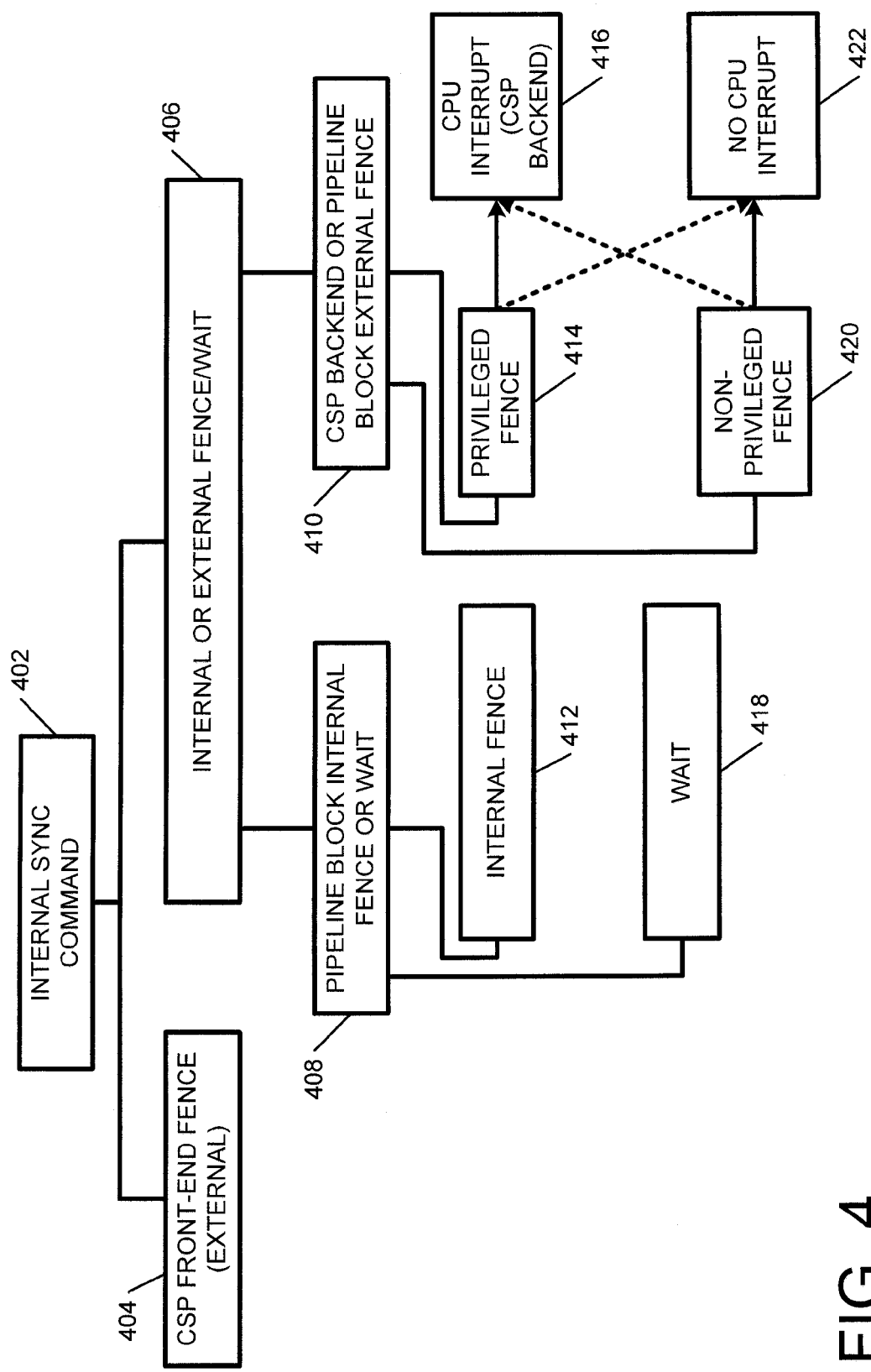
FIG. 4 is a diagram illustrating exemplary variations of a GPU barrier command.

FIG. 4 is a block diagram illustrating an example of variations of an embodiment of internal synchronization commands or internal sync token, such as in the GPU from FIG. 1. The following sync commands can be generated using an internal sync token, a Command Stream Processor (CSP) front-end Fence 404, an internal Fence 406, a wait 418, an external privileged fence with CPU interrupt or none 414, 416, respectively, and an external nonprivileged fence with a CPU interrupt or none 420, 422, respectively.

More specifically, upon receiving the internal sync command (block 402), a determination is made as to whether a fence is present. If a fence is present (FE=1), a CSP front end fence (external) can be utilized (block 404) using front-end part of a CSP. If a fence is not present (FE=0), the sync command can be executed as an internal or external fence/wait (block 406) in any pair of pipeline stages represented in FIG. 3A. If the external fence is not utilized (EXT=0), a pipeline block internal fence or wait can be utilized (block 408, leading to wait 418 or internal fence 412 depending on WT flag value).

Referring back to block 406, if an external fence/wait is utilized (EXT=1), a determination can be made whether a CSP backend of pipeline block external fence is utilized (block 410). If a privileged fence is utilized (PRI=1, leading to 414), a determination is made whether a CPU interrupt is desired. If INT=1, a CPU interrupt (CSP backend, block 416) is utilized. If INT=0, no CPU interrupt (block 422) is utilized. If, on the other hand, a non-privileged fence is utilized (block 420), a determination is made as to whether an interrupt is desired (blocks 416, 422).

Example of Synchronization Between Two GPU's with Fence/Wait Pair of Commands

These Internal sync mechanisms developed for synchronization of access for GPU pipeline units may be extended to support multiple GPUs. As a nonlimiting example, GPU A can be configured to render odd number bands of pixels and GPU B may be configured to render even bands of pixels. After rendering the Render Target (RT) memory surface can be used as a texture. Both GPUs can read the frame buffer of the other through the MXU with the proper tables set up and interface arranged, but the GPUs can be synchronized so that GPU A cannot read a buffer coupled to GPU B before GPU B has completed writing to the buffer, and vice versa.

Figure 5:
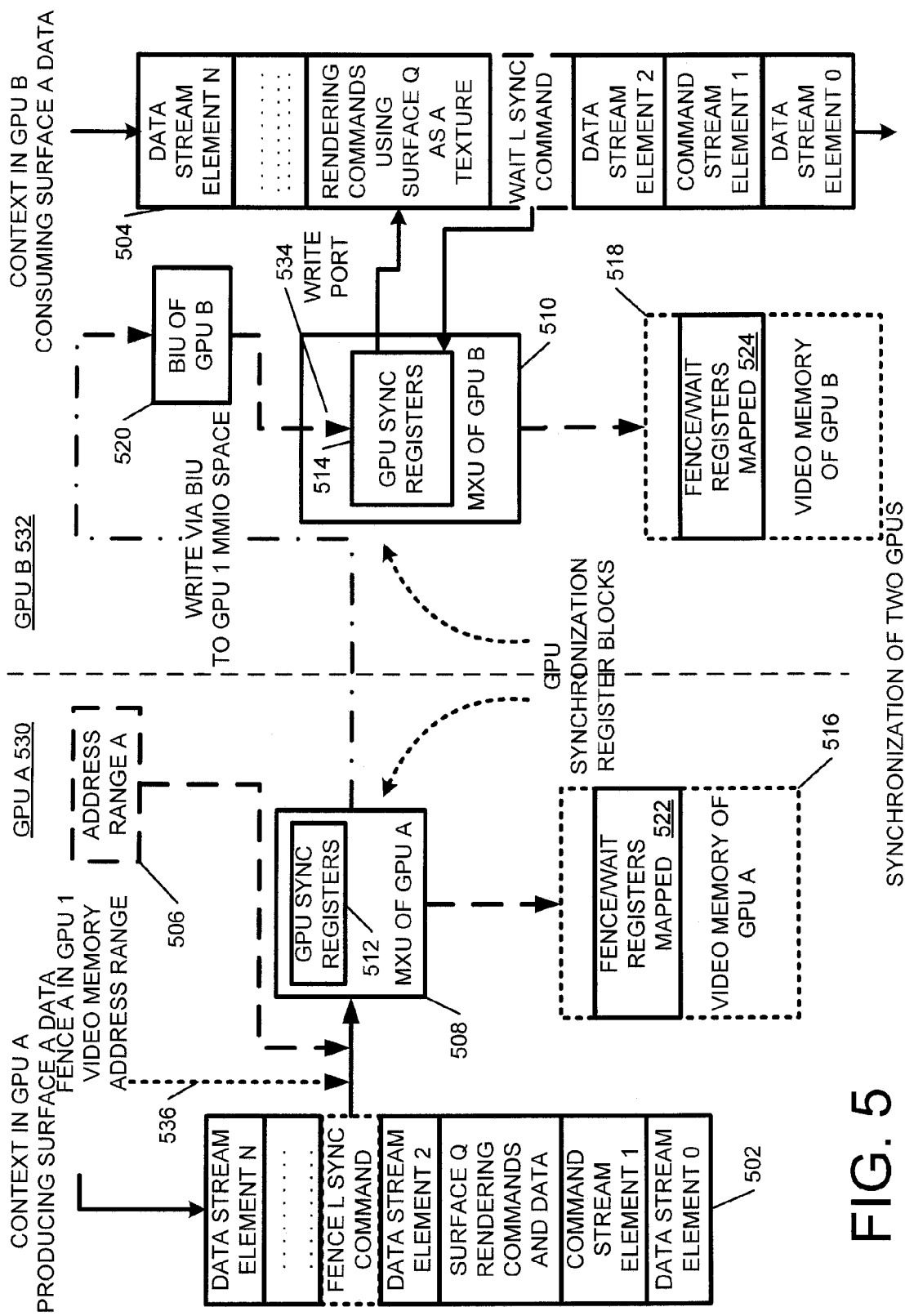
FIG. 5 is an example of a synchronization of two GPUs using barrier command.

FIG. 5 is a block diagram illustrating an embodiment of synchronization of GPUs, similar to the diagram from FIG. 4. One difference in this diagram is in the action of the fence command, which has an address mapped to another GPU address space. Another difference is in the execution of this fence command, which causes the miss to the CPU sync register block because the address is not in the range A 506. As illustrated in FIG. 5, an executable context data flow in GPU A 502 includes a data stream element N, fence L sync command, data stream element 2, surface Q rendering commands and data, command stream element 1, and data stream element 0. Similarly, included in executable context data flow in GPU B consuming surface Q data 504, is a data stream element N, rendering commands using surface Q as a texture, wait L sync command, data stream element 2, command stream element 1 and data stream element 0. Memory access unit of GPU A 508 can be configured to include GPU sync registers 512, and may receive fence L sync command from context in GPU A 502. Memory access unit of GPU A can be also configured to receive fence L in GPU B video memory address range 536, which is out of address range A 506 of internal fence/wait register block of GPU A. When fence L command comes with an address that is out of address range A 506, MXU 508 may have missed internal synchronization register block 512 of GPU A. MXU 508 can forward this fence L command data to the address, which may reside external to GPU A and may be located in GPU B memory space. MXU 508 can be coupled to video memory of GPU A 516, which includes fence/wait registers mapped 522. Memory access unit 508 can also write fence command via Bus Interface Unit (BIU) to GPU B Memory mapped input/output (MMIO) space when it has the address out of defined address range A for GPU A. BIU of GPU B 520 sends data to GPU B sync registers 514. GPU B sync registers 514 can send data to context in GPU B 504, and receive a wait L sync command, which may block GPU B pipeline if the pipeline value does not substantially match paired fence register value. Memory access unit of GPU B 501 sends data to video memory of GPU A, which can include fence wait registers mapped space 518.

To provide synchronization between multiple GPUs (e.g., GPU A 530 and GPU B 532), implementation of additional hardware features supporting simple inter-GPU synchronization may be desired. The additional hardware can be configured to operate differently, because GPU A 530 may be configured to write the fence command to address space of GPU B 532. A fence and wait pair can be inserted to two separate streams of a GPU command directed to different GPUs.

One should note that in at least one nonlimiting example, a GPU synchronization register block 514 can be configured with additional write ports 534 to provide direct write functionality from Bus Interface Unit (BIU) 520 when another GPU (e.g., GPU A 530) writes a value to synchronization register block 514. Additionally, BIU 520 can be configured to handle fence misses when a fence miss is directed to another GPU address space. The BIU 520 can be configured to handle external writes, as well as GPU synchronization registers 512, 514 that may be mapped to BIU MMIO address space. The MXU and BIU 520 can be configured to provide coherency of sync register block content with content of assigned (mapped) memory location (4K page) and write to the memory location along with modification of selected fence registers.

If the features described above are supported in a particular configuration, one may define the following action sequence for {GPU A}→{GPU B} type of synchronization. More specifically, the first step can include building a command sequence of function/state/draw commands for GPU A rendering pass. Next, the system can insert an internal fence command (to CSP and/or other unit) with an assigned count value (fence #) at the end of a surface rendering sequence. One should note that, depending on the particular configuration, the address in this fence command might not be in the range of GPU A fence/wait register block. Both address and register select fields can reside in the address range of GPU B 532, where actual fence/wait synchronization will be executed (see also FIG. 2).

Next, the system can build a command sequence of function/state/draw commands for GPU B rendering pass. Then, the system can insert an internal wait command (directed to CSP and/or other units) with the same (or similar) count value as the corresponding fence command in GPU A 530 command sequence. One should note that in GPU B input stream the internal wait command may be inserted before draw commands, which are intended to use the surface rendered by GPU A. The address in this wait command can reside in the range of GPU B fence/wait register block, where actual fence/wait synchronization can be executed. Additionally, the system can be configured to send draw commands, which can use the surface rendered by GPU A as input to Vertex Shader or Geometry Shader, depth Z-units, and texture unit. One should note that the block ID of the fence command in GPU A stream can include memory surface producer block ID (EUPF_STO, ZL2, WBU or any other block writing data to this memory surface. In a complex graphics pipeline, commands and tokens may be delivered via a common data path, which is why every block in pipeline may have a unique block ID, used in the header of commands for routing. Similarly, block ID of Wait command in GPU B stream can include Consumer block ID (CSP, ZL1 or other block which will read this memory surface data). Additionally, a particular producer/consumer block combination may be derived from single CPU synchronization patterns, described above. For the producer/consumer pairs, fence/wait register pairs can be assigned in consumer synchronization register block.

A plurality of GPUs may be configured to execute a plurality of contexts and, if inter-GPU synchronization procedure stalls a particular context for a long time, the GPU can be configured to switch stalled context and execute another one to keep high efficiency of GPU hardware. At the same time, one context may send a barrier synchronization command to another GPU context, which may be already suspended or in transition stage. That creates additional problems in synchronization of GPUs with multiple contexts and may require special attention to provide access to synchronization registers of GPU contexts saved in the memory and special transition status of context to prevent RAW data hazards. While the nonlimiting example of FIG. 5 illustrates just two GPUs interacting using a barrier fence/wait primitive, one should note that this concept can be extended to a plurality of GPUs using capabilities of a PCI-E bus.

A plurality of GPUs may be connected via a chipset interface and can send a fence value to a predetermined address space related to another GPU. When an internal sync command is directed out of a particular GPU address space, an external fence miss can be processed by logic in a Peripheral Component Interconnect Exchange (PCI-E) interface. A fence value from an internal sync command can be redirected to the GPU with matching address space limits (see FIG. 6). External fences and waits for Advance Scheduler (AS) can be redirected to CPU system memory by the same logic.

There are a plurality of synchronization configurations, including but not limited to a GPU to CPU synchronization when fence values are written to a CPU address space and an operating system Advanced Scheduler (AS) processes other actions. Described above GPU commands with associated hardware units may support such synchronization primitives, as well. This configuration also can be used for inter-GPU via AS, as disclosed in Microsoft® Document "Parallel Engines support in the LDDM Basic Scheduling model," which is hereby incorporated by reference in its entirety.

Another variation of synchronization is an Inter-GPU synchronization where a plurality of GPUs' can be configured to barrier sync with each other without CPU intervention. This configuration may utilize special arrangements in GPU hardware, as well as support of a system interface (e.g., PCI-Express). One should note that a physical implementation of multiple GPU-CPU system can be based on PCI-Express bus and/or on any other interfaces providing multiple CPU-GPU interaction.

Synchronization with More than Two GPUs

Figure 6:
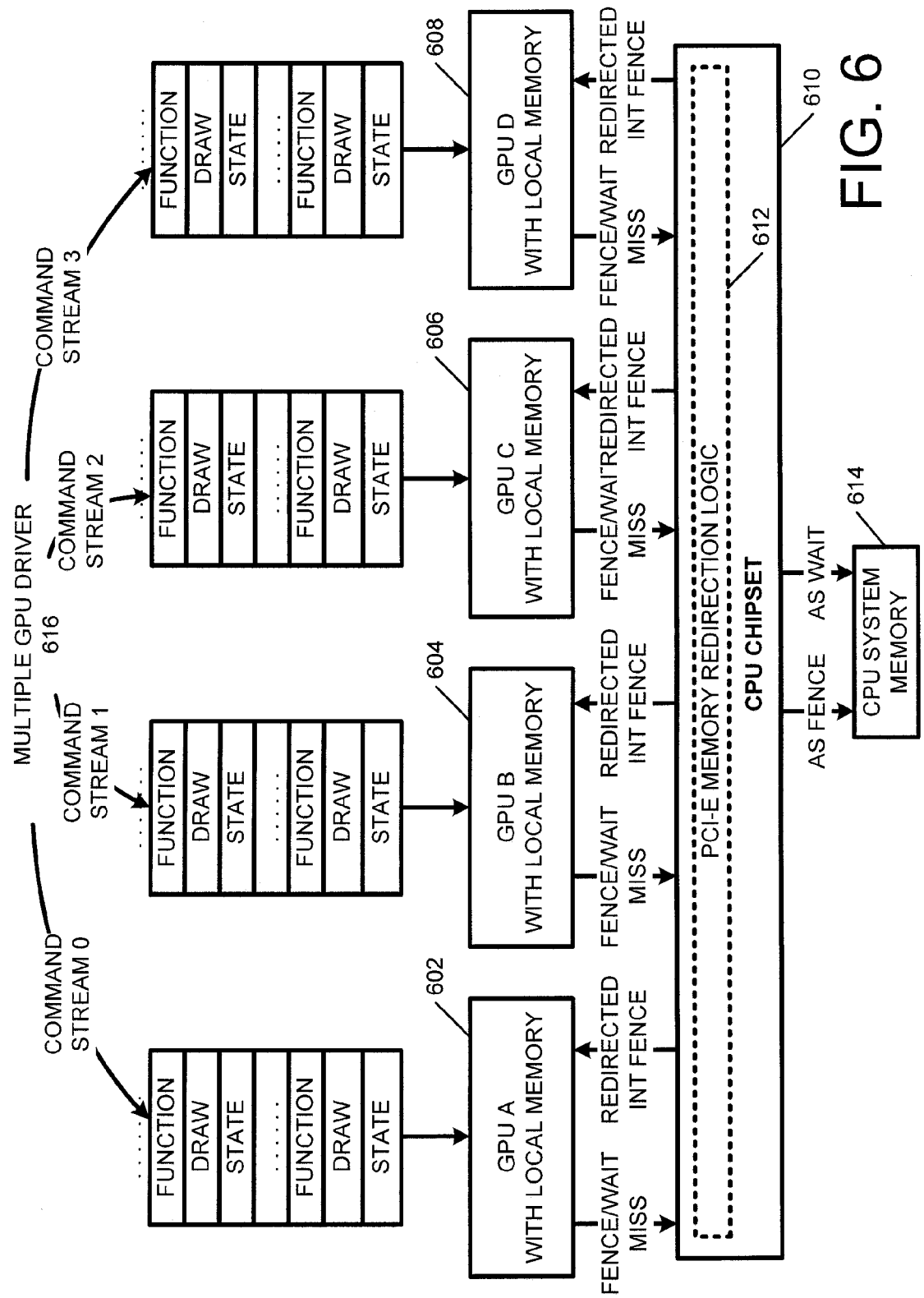
FIG. 6 is a block diagram illustrating multiple GPU system built on PCI-Express interface.

A basic implementation of this procedure with an internal sync command, along with the ability of an interface to redirect memory/sync registers writes according to their address to different GPUs can provide techniques for synchronization in a multiple GPU configuration. FIG. 6 is a block diagram illustrating an embodiment of a GPU structure with a chipset interface. More specifically, a multiple GPU driver 616 can be configured to send a plurality of command streams to any of a plurality of GPUs. In the nonlimiting example of FIG. 6, multiple GPU driver 616 can be configured to send command stream 0 to GPU A, with local memory 602. Similarly, command stream 1 is sent to GPU B 604, command stream 2 is sent to GPU C 606, and command stream 3 is sent to GPU D 608. Each GPU 602-608 can be configured to send a fence/wait miss to CPU chipset 610, via PCI-E memory redirection logic 612, and receive redirected internal fence from CPU chipset 610. CPU chipset 610 can be also configured to send an Advanced Scheduler (AS) fence and/or an AS wait to CPU system memory 614.

While any of a plurality of topologies can be utilized, below is a description of three types of GPU synchronization topologies that can be used in a multiple GPU configuration. More specifically, a Join type (Multiple producers—One consumer) topology can be used, a Fork type (One producer—multiple consumers) topology can be used, and/or a Join-Fork type (Multiple producers—multiple consumers) topology can be used. These topologies can be synchronized using an internal sync command and CSP hardware, however this is not a requirement. Other types of synchronization with wires and tokens can be used as well.

Figure 7:
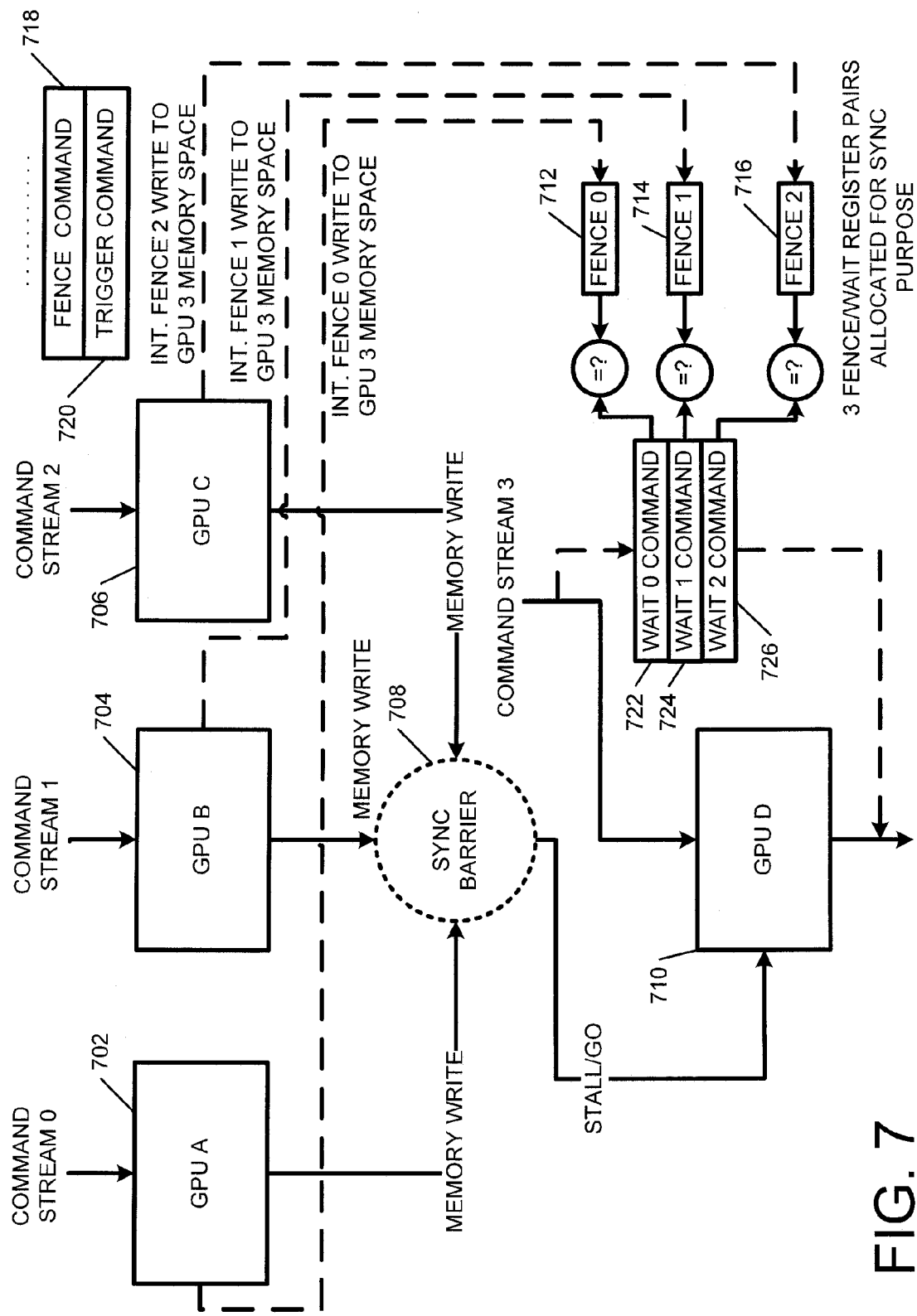
FIG. 7 is a block diagram illustrating an exemplary embodiment of join-type synchronization for multi-GPU system on FIG. 6.

A join type synchronization scheme is the case when multiple GPUs can reach a certain point (barrier) in their command stream execution and another GPU can start a command stream execution using data generated by multiple GPUs, as illustrated in FIG. 7.

FIG. 7 is a block diagram illustrating a join type synchronization between GPUs, similar to the GPUs from FIG. 6. More specifically, in this nonlimiting example, three parallel GPU processes (contexts) running on GPU A 702, GPU B 704, and GPU C 706 or producers can be configured to generate data that can be used by a fourth GPU process running on GPU D 710. GPU A 702, GPU B 704, and GPU C 706 can be configured for image rendering and/or general purpose (GP) computing and generating data to be written to the memory using Trigger command 520 causing internal cache to be flushed to the memory accessible by consumer GPU. GPU D 710 can include a context that can be started (or continued) when data in memory becomes valid, assuming that GPU A, B, C complete their writes to this memory surface.

In GPU D 710 sync register block, the driver can be configured to allocate three pairs of fence/wait registers 712, 714, and 716 for GPU A 702, B 704, and C 706, respectively and map them to GPU D 710 context address space. In each context command stream buffer for GPU A 702, B, 704, C 706, and D 710 the driver can be configured to insert a fence command directed to a desired fence/wait pair in the GPU D 710 address space. The Fence commands 718 can be configured to follow trigger commands 720 flushing content of GPU caches to memory. Additionally, in the command stream buffer for GPU D 710, the driver can also be configured to insert internal wait commands with CSP block ID and directed to a desired register pair allocated for GPU A 702, B 704, C 706, and D 710.

The wait commands can stall GPU D 710 context execution until the fence values 712, 714, and 716 arrive to allocated fence registers in GPU D 710 sync register block. Additionally, a combination of fence and wait commands executed on multiple GPUs can create a synchronization barrier 708 when all three contexts in the first three GPUs (GPU A 702, GPU B 704, and GPU C 706) reach point where GPU D 710 starts processing command and data stream. Such a scenario can occur after spinning on the 3 wait commands (722, 724, and 726) comparing their values to the content of fence registers, which may be written by other GPUs.

Figure 8:
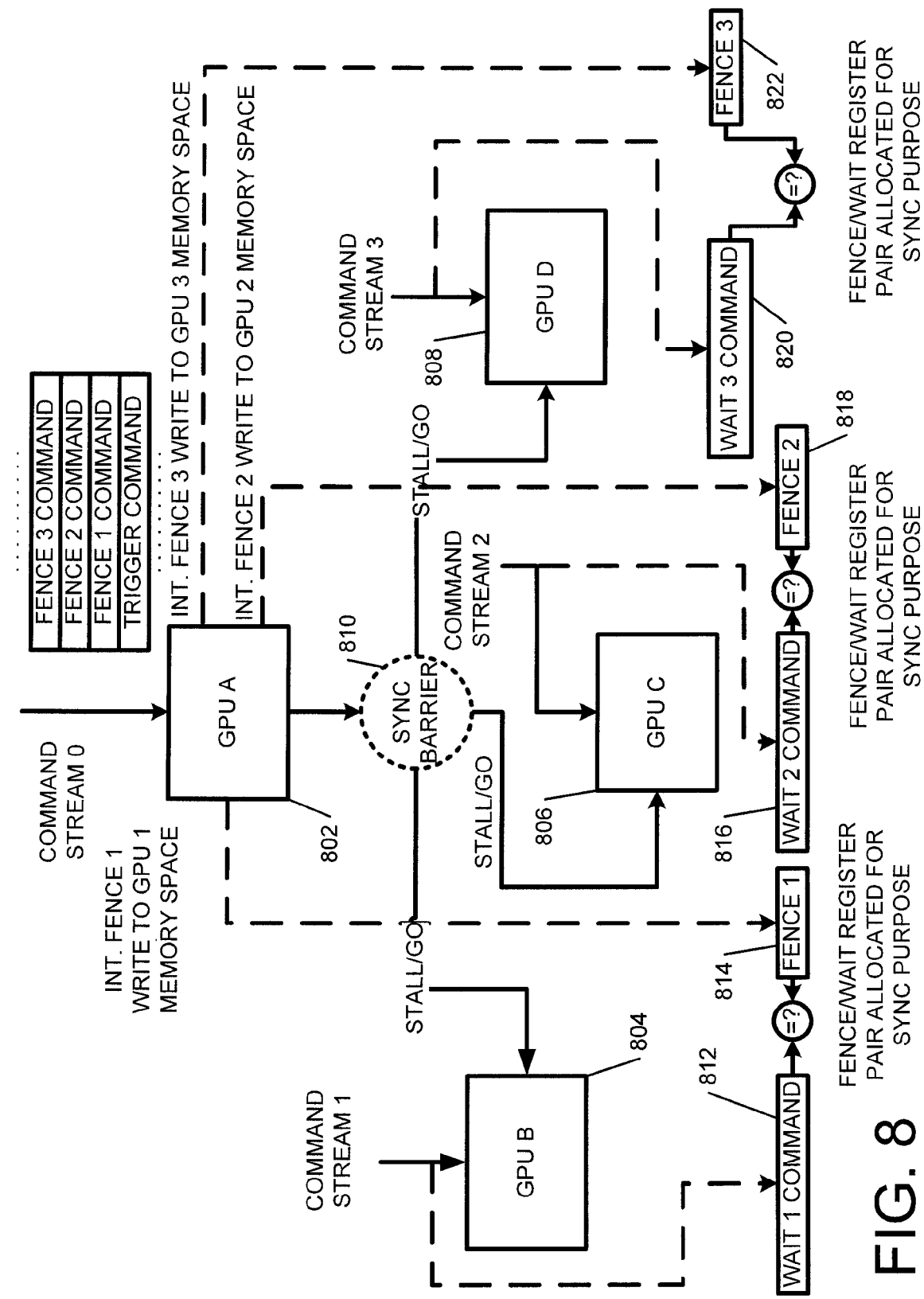
FIG. 8 is a block diagram illustrating an exemplary embodiment of fork-type synchronization for multi-GPU system on FIG. 6.

FIG. 8 is a block diagram illustrating an embodiment of a fork type synchronization of multiple GPUs, similar to the configuration from FIG. 7. More specifically, a fork type synchronization scheme assumes that a plurality GPUs can use the data generated by single GPU. Data generated by one producer (e.g., GPU A 802) can be used by a plurality of consumers (e.g., GPU B 804, GPU C 806, GPU D 808) running in parallel.

As illustrated in the nonlimiting example of FIG. 8, three parallel GPU processes (contexts) running on GPU B 804, GPU C 806, and/or GPU D 808 can be configured to consume the data that can be generated by fourth process running on GPU A 802. GPU A 802 may have a context that is configured to generate this data in a process (context) which starts first. The other three GPUs (804, 806, 808) can wait for the data to be written to the memory. When data is available, GPU B 804, GPU C 806, and/or GPU D 808 can be configured to start execution of their contexts.

In GPU B 804, GPU C 806, and/or GPU D 808 MXUs, the driver can be configured to allocate three pairs of fence/wait registers in sync register block that can be arranged to receive a fence value from GPU A 802. In GPU A 802, context command stream buffer, the driver can be configured to insert three internal fence commands with a similar value directed to a desired fence/wait pair in the GPU B 804, GPU C 806, and/or GPU D 808 address spaces. The fence commands can be configured to follow trigger command flushing content of relevant caches of GPU 0 to memory.

In command stream buffers for GPU B 804, GPU C 806, and/or GPU D 808, the driver can be configured to insert internal wait commands with CSP block ID and directed to desired register pairs allocated in the MXU of GPU B 804, GPU C 806, and/or GPU D 808 for synchronization with GPU A 802. The wait commands can be configured to stall GPU B 804, GPU C 806, and/or GPU D 808 context execution until matching internal fences arrive from GPU A 802 to the allocated MXU fence registers of GPU B 804, GPU C 806, and/or GPU D 808. A combination of Fence commands executed on GPU A 802 can create a synchronization barrier when all three contexts in GPU B 804, GPU C 806, and/or GPU D 808 start synchronously processing when a data block to be accessed is ready.

Figure 9:
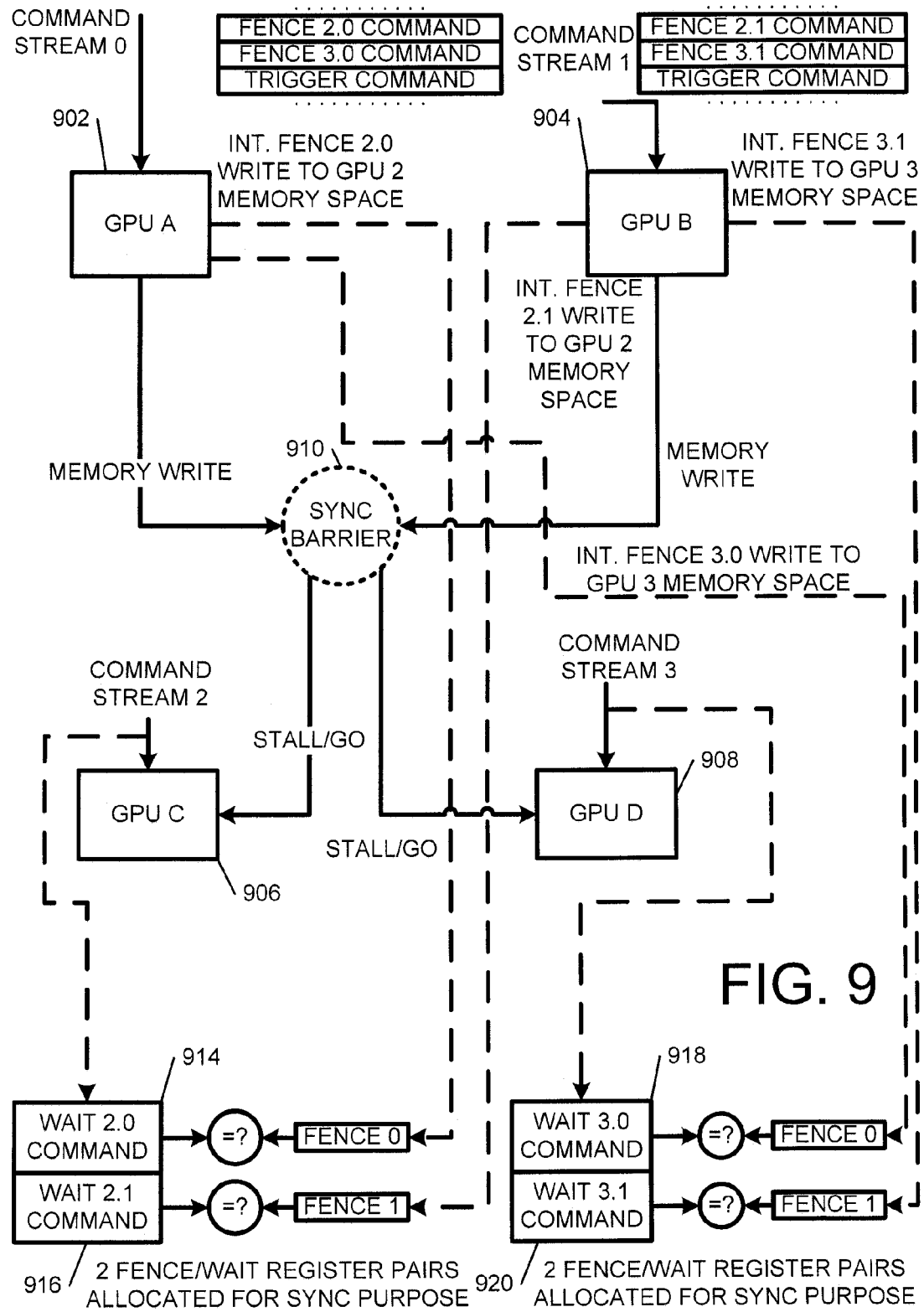
FIG. 9 is a block diagram illustrating an exemplary embodiment of join-fork type synchronization for multi-GPU system on FIG. 6.

FIG. 9 is a block diagram of an embodiment of a join-fork type synchronization of multiple GPUs, similar to the diagram from FIG. 8. More specifically, a join-fork type synchronization scheme assumes that a first set of GPUs can use the data generated by a second set of GPUs. Several consumers running in parallel can utilize data generated by a plurality of producers.

As illustrated in the nonlimiting example of FIG. 9, a plurality of parallel GPU processes (contexts) running on a first set of GPUs (GPU C 906, GPU D 908) can be configured to consume data that can be generated by processes running on a second set of GPUs (GPU A 902, GPU B 904). The contexts associated with GPU A 902 and GPU B 904 can be configured to generate the data in the processes (contexts), which may start first. GPU C 906 and GPU D 908 can be waiting for the data to be written in memory. When data is available, GPU C 906 and GPU D 908 can begin execution of their contexts.

In the MXU related to GPU C 906 and GPU D 908, the driver can be configured to allocate a plurality of pairs of fence/wait registers that are arranged to receive an internal fence command from GPU A 902, GPU B 904. In GPU A 902 and GPU B 904, a context command stream can buffer the driver and can insert a plurality of internal fence commands that are directed to a desired fence/wait pair in GPU C 906 and GPU D 908 address spaces. The Fence commands can be configured to follow a trigger command, flushing the content of relevant caches of GPU A 902 and GPU B 904 to memory.

In command stream buffers for GPU C 906 and GPU D 908, the driver can be configured to insert internal wait commands with CSP block ID. The driver can also be directed to register pairs that are allocated in the MXU that is related to GPU C 906 and GPU D 908, for synchronization with GPU A 902 and GPU B. The wait commands can stall GPU C 906 and GPU D 908 context execution until the matching internal fences arrive from GPU A 902 and GPU B 904, respectively.

A combination of fence and wait commands executed on a plurality of GPUs can create a synchronization barrier when two contexts in GPU A 902 and GPU B 904 can reach a point where GPU C 906 and GPU D 908 may start processing their own commands. Additionally, GPU C 906 and GPU D 908 may also begin processing data streams after spinning on the two wait commands.

One should note that the configuration of FIG. 9 is not limited by a four GPU configuration. As one of ordinary skill in the art will understand, the principles described above can apply for any configuration of GPUs. Additionally, while the synchronization schemes described above can facilitate synchronization between a plurality of GPUs, at least one configuration may be designed to manage overall GPU workload and/or and multiple contexts and threads running in the system.

Configuration of multiple GPUs described in FIG. 7-FIG. 9 may implement synchronization relatively smooth in case of assumption using a single context GPU, which may be active and waiting for barrier synchronization data and command. There may be significant potential inefficiencies of stalled GPUs that may affect the using of multiple machines to increase performance. In the case of multiple context GPUs with a context switch and a spinning wait, the GPU may have additional circuits to support barrier type synchronization with the context being temporarily suspended on a the spinning wait.

Figure 10:
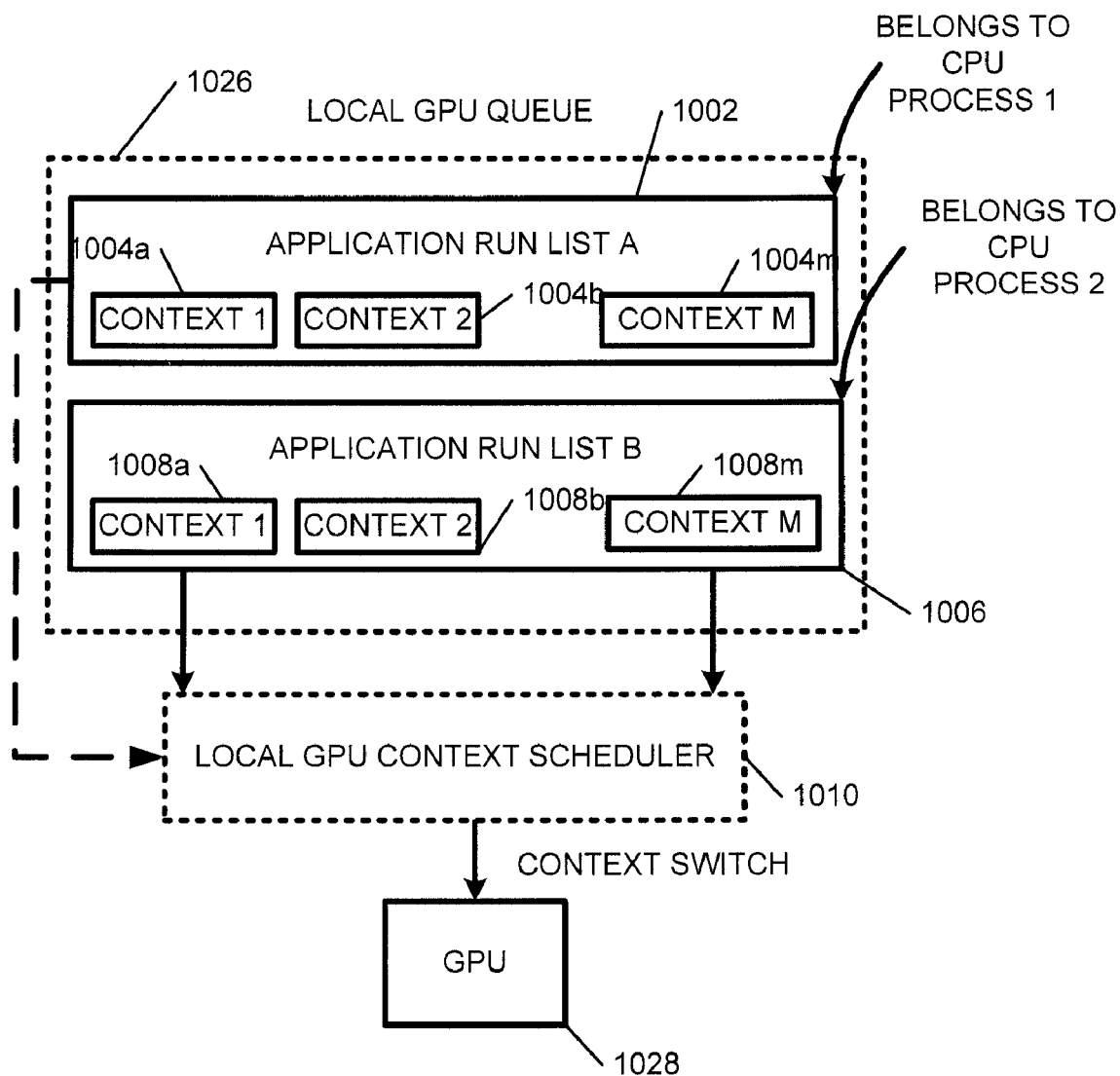
FIG. 10 is a block diagram illustrating a plurality of GPU contexts and local GPU scheduler.

FIG. 10 illustrates an embodiment of a GPU that can be configured to process a plurality of contexts combined in a plurality of run lists. Local GPU task queue 1026 includes application run list A 1002 includes a one or more context 1004*a*, 1004*b*, and 1004*m*, where context m (1004*m*) indicates that any number of contexts may be present in application run list A 1002. Similarly, local GPU queue 126 can include application run list b 1006. Application run list b 1006 can include one or more contexts 1004*a*, 1004*b*, and 1004*m*. The local GPU queue 126 can be configured to send data from an application run list 1002, 1006 to the local GPU context scheduler 1010. The local GPU context scheduler 1010 can be configured to communicate at least a portion of this data via a context switch to GPU 1028.

Figure 11:
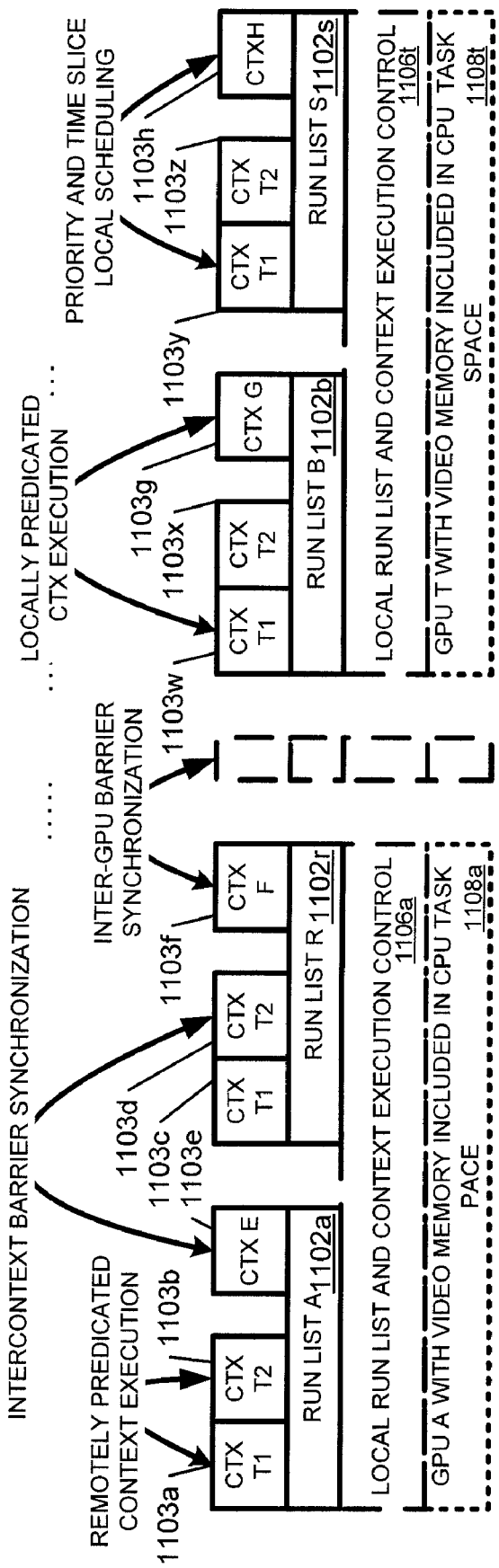
FIG. 11 is an illustration of exemplary guidelines in an inter-context and inter-GPU synchronization in the system

In a configuration of multiple context/multiple GPU illustrated in FIG. 11 synchronization requirements may include inter-context barrier synchronization and inter-GPU barrier synchronization. Included in the nonlimiting example of FIG. 11 are a plurality of contexts 1104*a*-1104*h* and 1104*w*-1104*z*, as well as a plurality of run lists, 1102*a*, 1102*b*, 1102*r*, 1102*s*. Local run list and context execution control blocks 1106*a*, 1106*t* of the GPUs 1108*a*, 1108*t* can provide management of such type synchronization. Embodiments described herein can be configured to synchronize not only GPUs with single context, but multiple contexts that can be switched and monitored to provide fair execution and guaranteed completion in expected time intervals. Further, some of contexts may not be in "running" status and the GPUs may be configured to accept a fence value addressed to suspended contexts.

To support the functionality of barrier synchronization, a local GPU execution control unit 1106 can be configured to maintain and monitor each context status. Context states for such synchronization may include the following steady states, among others:

1) "Running" when context is being executed in GPU pipeline;

2) "Empty" when context has no command to execute and command fetch head pointer have the same value as command write tail pointer;

3) "Ready" when context is ready to be executed; and

4) "Suspended" when context is suspended from execution for whatever reason described in the suspension code register.

There may be a plurality of intermediate or transition states that describe pending context save and pending context restore. These states are required to support barrier synchronization with contexts in transition. Additionally, context state change is provided by special state machine illustrated in FIG. 12, which may be configured to change the states based on certain events, local scheduler actions and/or conditional synchronization commands.

Figure 12:
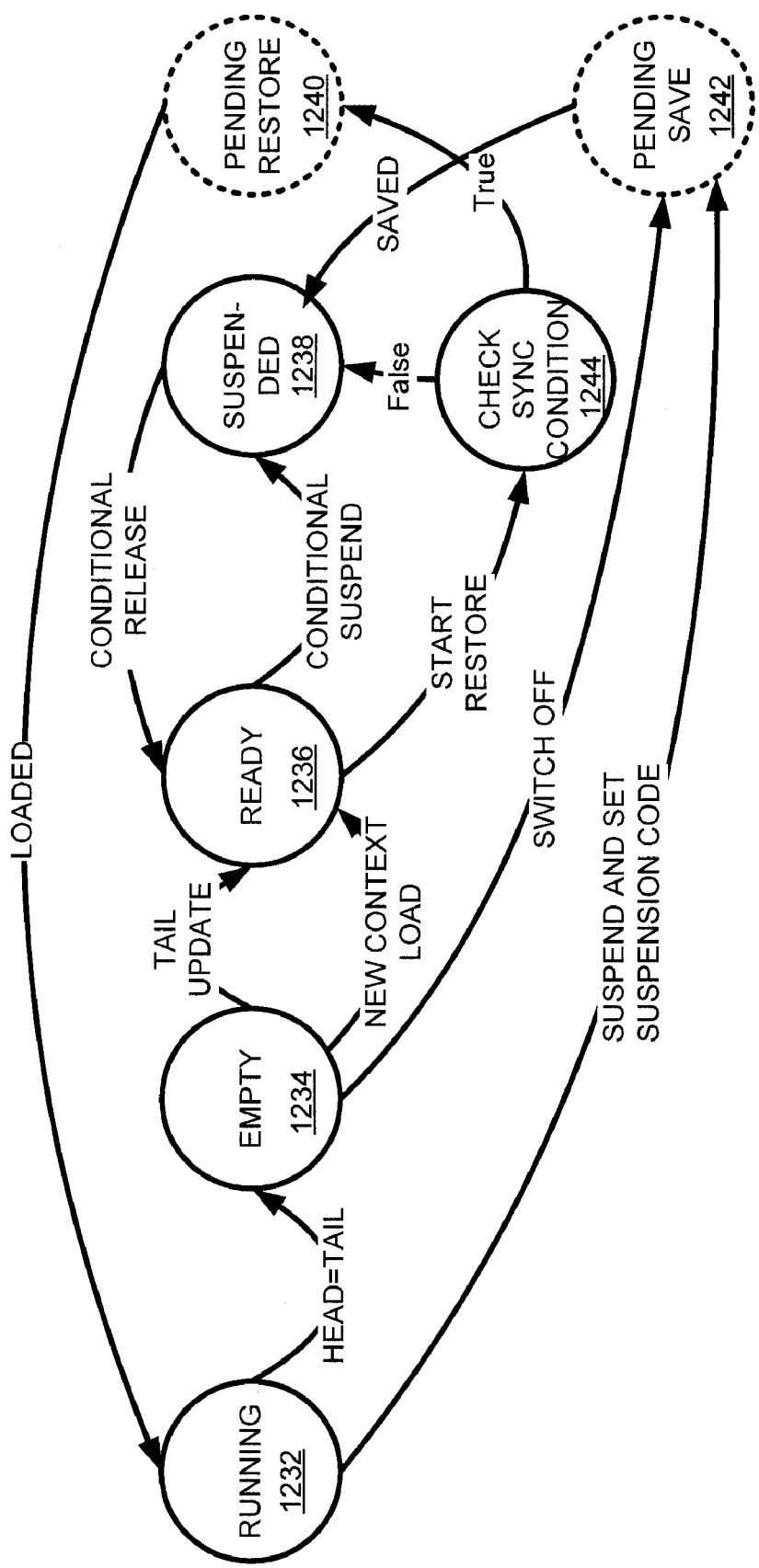
FIG. 12 is an exemplary state machine, illustrating an embodiment of various status of GPU context and changing this status based on internal and external event.

FIG. 12 is a flow diagram illustrating exemplary data flow related to the context states from FIG. 11. More specifically, in the nonlimiting example of FIG. 12 there are four main stable stages of context status: "Running" 1232, "Empty" 1234, "Ready" 1236, and "Suspended" 1238. There are two intermediate stages: "Pending Save" 1240 and "Pending Restore" 1242, which can be used to indicate the processes of context state load and save. The "Running" state 1232 indicates that a context is currently running in GPU pipeline. This status may be changed when a head pointer reaches the tail and there are no more commands in the stream to process. Another reason might be that "Context Suspend" 1238 is based on events that set suspension code. "Empty" 1234 status indicates that the context has nothing to do and may be deleted by loading new context in associated context register block. If a CPU updates the tail pointer, the CPU may return to "Ready" state 1232 and can be restarted any time. Empty contexts may cause automatic switch off of this context and saving the state in the memory. After that occurs, the context status may change to "Suspended."

"Ready" 1236 indicates that the context can be started any time by local scheduler according to priority or order of context switch procedure. This context may check conditions before restart if the context is alerted 1244 in status register. If a sync condition is not satisfied, the context returns to "Suspended" status 1238. "Suspended" status 1238 indicates that the context is waiting for some conditions to be ready to start execution. Condition satisfaction as a result of internal event or external messages may release this context to "Ready" status 1236. "Pending Save" 1240 and "Pending Restore" 1242 are temporal intermediate states between "Running" 1232 and "Suspended" 1238. These states may be utilized in case of any access to memory mapped registers, which may be at the memory and/or in the GPU.

Multiple GPU with Multiple Context Synchronization

Figure 13:
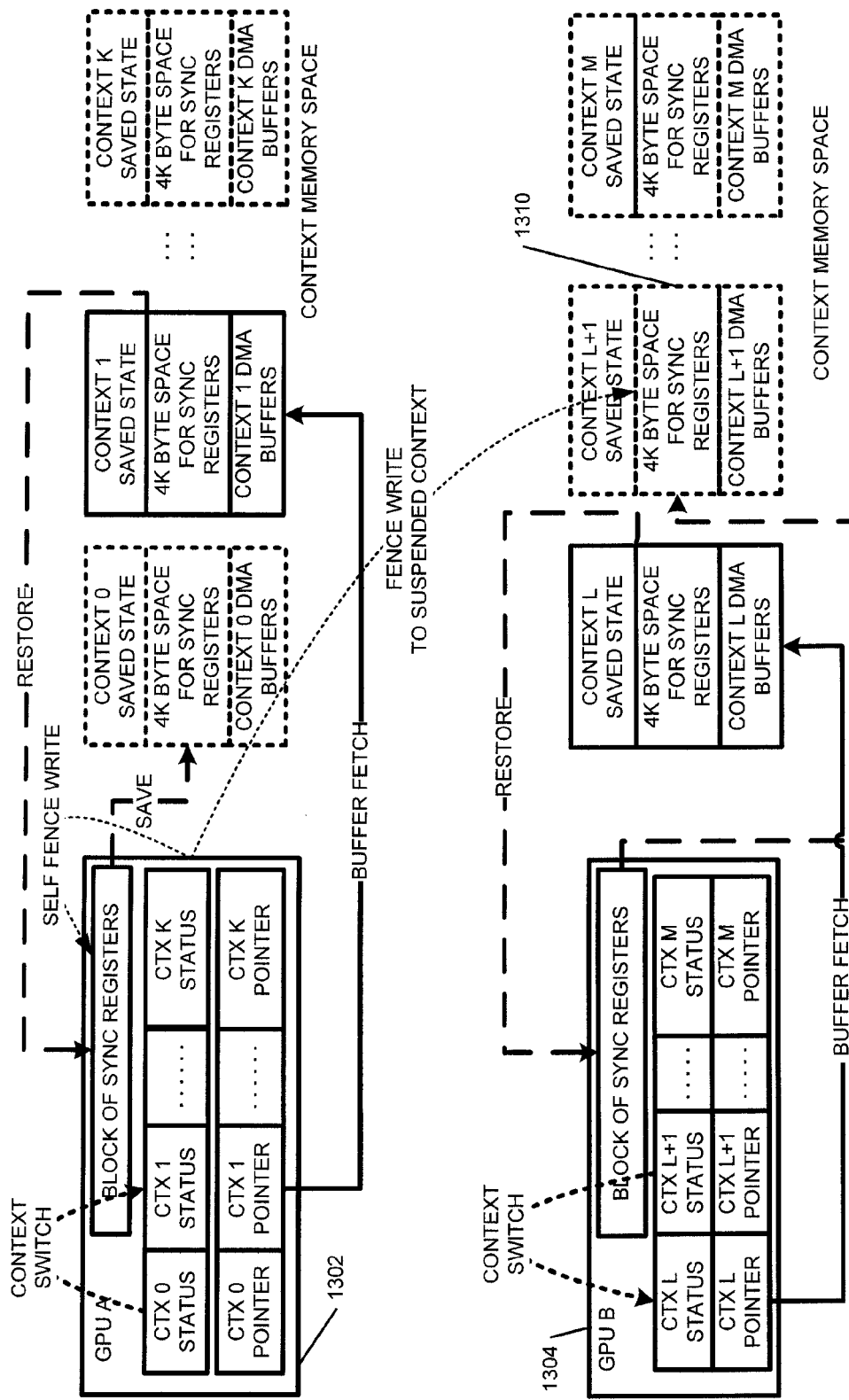
FIG. 13 and FIG. 14 are illustrations of an exemplary barrier execution with contexts on different status.

FIG. 13 is a block diagram of an embodiment of synchronization transactions in a four-GPU multi-system where a GPU may have up to K contexts, similar to the GPUs from FIG. 9. K can be any number, but in at least one embodiment, K can be a number between 4 and 16. In the case of two run lists, the number might be 2K. Additionally, the fence command can be configured to write to blocks of sync registers in a GPU (running context) and in the memory (other contexts) can be carefully executed to reduce the possibility of a Write After Read (WAR)/Write After Write (WAW) hazard.

As illustrated in FIG. 13, multiple context GPU A 1302 includes a block of sync registers, a plurality of context status blocks, and a plurality of context pointers. GPU A 1302 can be configured to execute, via a buffer fetch, context DMA buffers associated with a predetermined context (e.g., context 1, as shown in FIG. 13). Additionally, context related sync registers may be restored to the block registers and/or saved to the allocated 4K byte page in context memory space. Similarly, other GPUs can be configured with similar functionality. Depending on internal and/or external events, GPU A 1302 may switch from execution of context 0, for example, to context 1. In this case, context state related data may be saved in a memory space allocated for context states. The content of sync register block may also be important for context execution and may be saved in special memory page, which is a part of context state data space. After saving context 0 state and sync register data, new context 1 state and sync register data may be loaded to GPU A. After upload, GPU A may begin to execute context 1 by fetching commands from DMA buffers allocated for this context.

Figure 15:
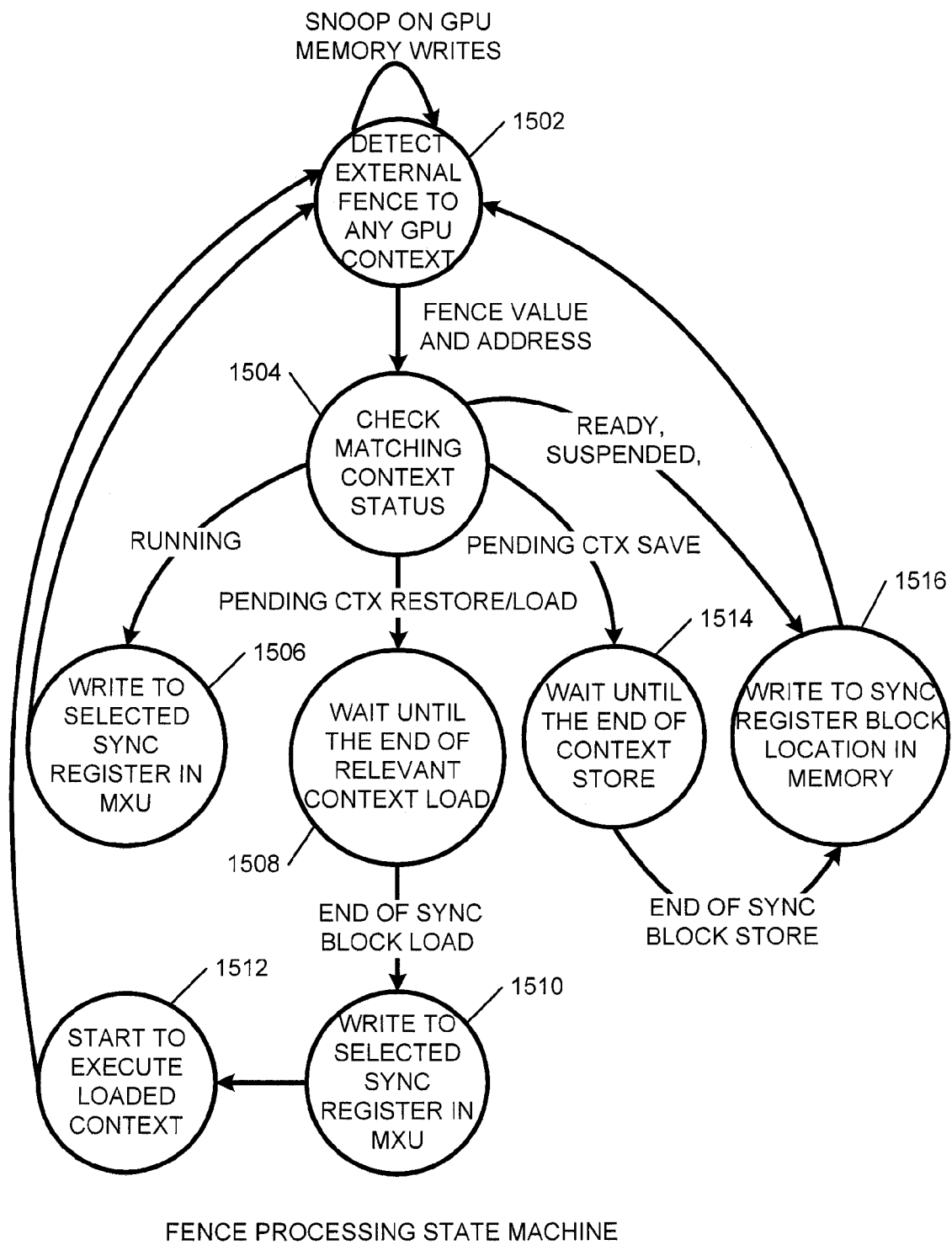
FIG. 15 is a fence processing state machine for environment described in FIGS. 13 and 14.

GPU B, working in parallel with GPU A may execute a different context L+1 context and switch back to context L implementing the same procedure as GPU A for saving context L+1 state and sync registers content. Context L state data with sync registers content can be restored in GPU B and may begin to fetch context L commands from associated DMA buffer in context memory space. While executing a current context, one or more GPU may write fence data to other contexts in following status:

1) Self fence write (regular internal fence for pipeline synchronization, (FIG. 2, FIG. 3);
2) Fence write to suspended context of own or another GPU;
3) Fence write to running context of another GPU;
4) Fence write to context being suspended (save in progress);
5) Fence write to context being activated (restore in progress);

These cases may involve special handling, which may be provided by GPU hardware state machine described in FIG. 15. This can be a reason that fence writes snooping (see FIG. 15) can be utilized to provide synchronization in multiple GPU-multiple context environments between different contexts and run lists. To provide such snooping, one may utilize a special address range register for one or more context in the GPU, as well as comparison logic located in a memory access unit. This logic may cause the change of status of a particular context if the expected fence is written to a sync register block saved in the memory.

Figure 14:
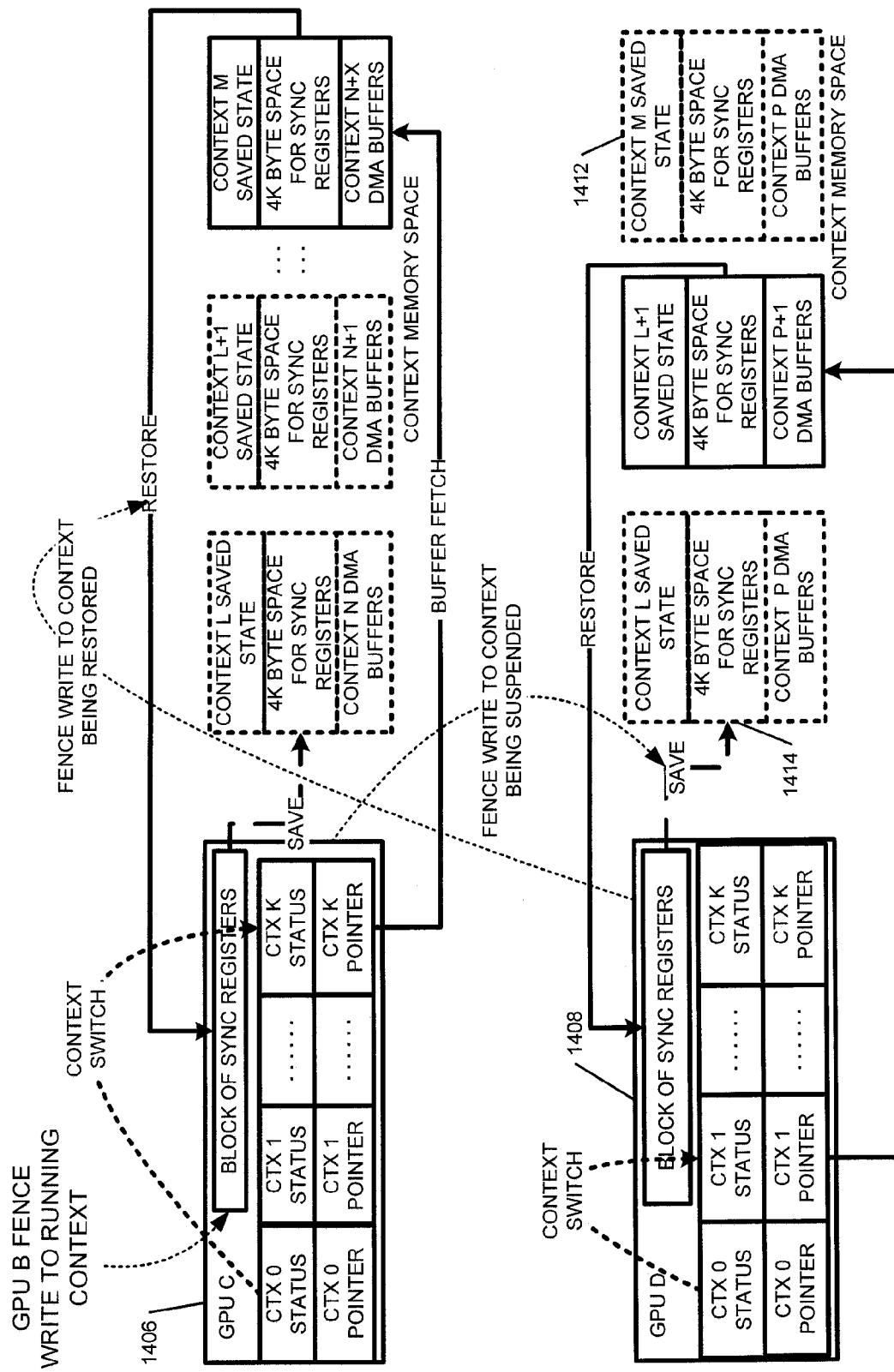

FIG. 14 is a block diagram, further illustrating multiple GPUs with multiple context synchronization and synchronization between multiple contexts, similar to the diagram from FIG. 13. More specifically, as illustrated in FIG. 14, GPU C 1406 can be configured to fence write to context being suspended, at 4K-byte space for sync registers 1414. Similarly, GPU D 1408 can be configured to fence write to context being restored with block of sync registers in GPU C 1406. To support such cases, the GPU may be equipped with special logic, which may be configured to hold the barrier sync command address and data until the context reaches one of the stable states finishing a save or restore procedure.

In general, a CPU can be programmed to control context scheduling and execution in a GPU. There are tools available in GPU implementations, such as described in application Ser. No. 11/272,356, entitled "Interruptible GPU And Method For Context Saving And Restoring," application Ser. No. 11/271,169, entitled "Interruptible GPU And Method For Processing Multiple Contexts And Runlists," and application Ser. No. 11/272,220, entitled "Graphics Pipeline Precise Interrupt Method And Apparatus," which are all hereby incorporated by reference in their entireties.

FIG. 15 is a state machine illustrating an embodiment of steps that may be taken in fence barrier command processing. More specifically, the GPU can detect an external fence from another GPU and/or CPU to any GPU context (circle 1502). Upon detecting an external write to GPU memory space and address, which may be compared with context sync block address 1324 in GPU context register blocks, the GPU can check matching context status (circle 1504). If a process is running, the GPU can write directly to a selected sync register in the MXU (circle 1506) and can resume detecting an external fence write to any GPU context (circle 1502).

If, at circle 1504, a pending context restore/load status is detected for a matching context, the GPU can wait until the end of a relevant context load (circle 1508). At the end of a sync block load, the GPU can directly write to a selected sync register in the MXU (circle 1510). The GPU can then begin to execute a loaded context (circle 1512). The GPU can then resume detecting an external fence write to any GPU context (circle 1502).

If, at circle 1504, a pending context save is detected, the GPU can wait until the end of a context store (circle 1514). At the end of a sync block store, the GPU can write to a sync register block location in memory (circle 1516). The GPU logic can return to detecting an external fence to any GPU context (circle 1502). If, on the other hand, at circle 1504, the GPU is ready, and/or wait suspended, the GPU can write to sync register block location in memory (circle 1516). The GPU logic can then return to detecting an external fence to any GPU context.

Figure 16:
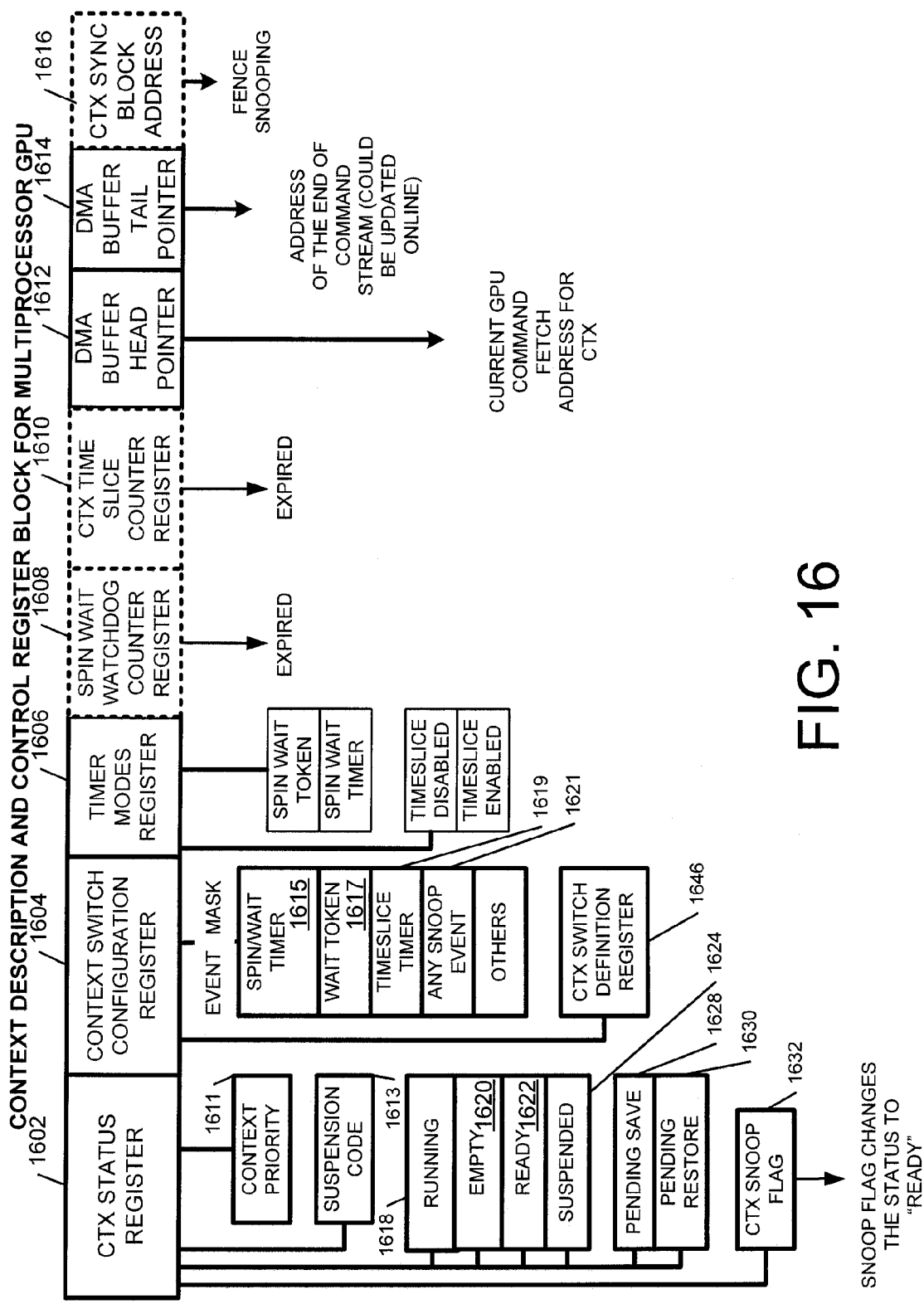
FIG. 16 is a structure of a context register block supporting multiple context synchronization.

FIG. 16 is a block diagram illustrating context register block that can be combined into at least one run list, similar to the run lists from FIG. 10. More specifically, included in FIG. 16 are a context status register, 1602, a context switch configuration register 1604, and a timer modes register 1606 and a spin wait counter register 1608. Also included are a context time slice counter register 1610, a DMA buffer head pointer 1612, a DMA buffer tail pointer 1614, and a context sync block address 1616. Context sync block address register can be located in memory access unit.

As discussed above, context status register 1602 can include status bit masks for running 1618, ready 1620, empty 1622, suspended 1624, and pending save 1628. Also included in this category are pending restore 1630. Context priority level 1611 and suspension status code 1613 are also included in context status register 1602. Context switch configuration register 1604 includes an event mask that defines context management to such events as spin wait timer expiration 1615, wait token arrival to pipeline block 1617, time slice timer expiration 1619, and snoop events when MXU circuits detect a write to sync block address of a context in the GPU. Other events may also be configured for sensitivity on context status management logic. Timer modes register 1606 can be configured to control the mode of context switch defining a spin wait token and/or spin wait timer to generate a switch event. The register may also enable and/or disable a time slice based context switch mode. Spin wait watchdog timer 1608 down count may be started in case of any wait command, which starts to spin in the case of a data mismatch with fence register content in sync register block. When the timer expires, spin wait watchdog timer 1608 may initiate a context switch event, if not made in 1604. The context time slice counter register 1610 can be used to switch contexts in case of execution time slice expiration. Time slice counter can also be used to recover from possible hangs of context currently running in the GPU pipeline.

Additionally, DMA buffer head pointer 1612 can be configured to keep the current fetch addresses for contexts for command streams, while the DMA buffer tail pointer 1614 can be configured to convey an address at the end of the command stream. The context sync block address can be configured for fence snooping. While in at least one configuration, if the total number of allowed contexts is 16, the contexts may be grouped into 2 run lists with 8 context each or 4 run lists with 4 context each. It is possible also to group the contexts to uneven groups, as well. Context synch block address register 1616 can be configured to provide the address for snooping of any writes to GPU video memory and may generate context status change events in the case of detection of external fence write to memory mapped synchronization register block.

Figure 17:
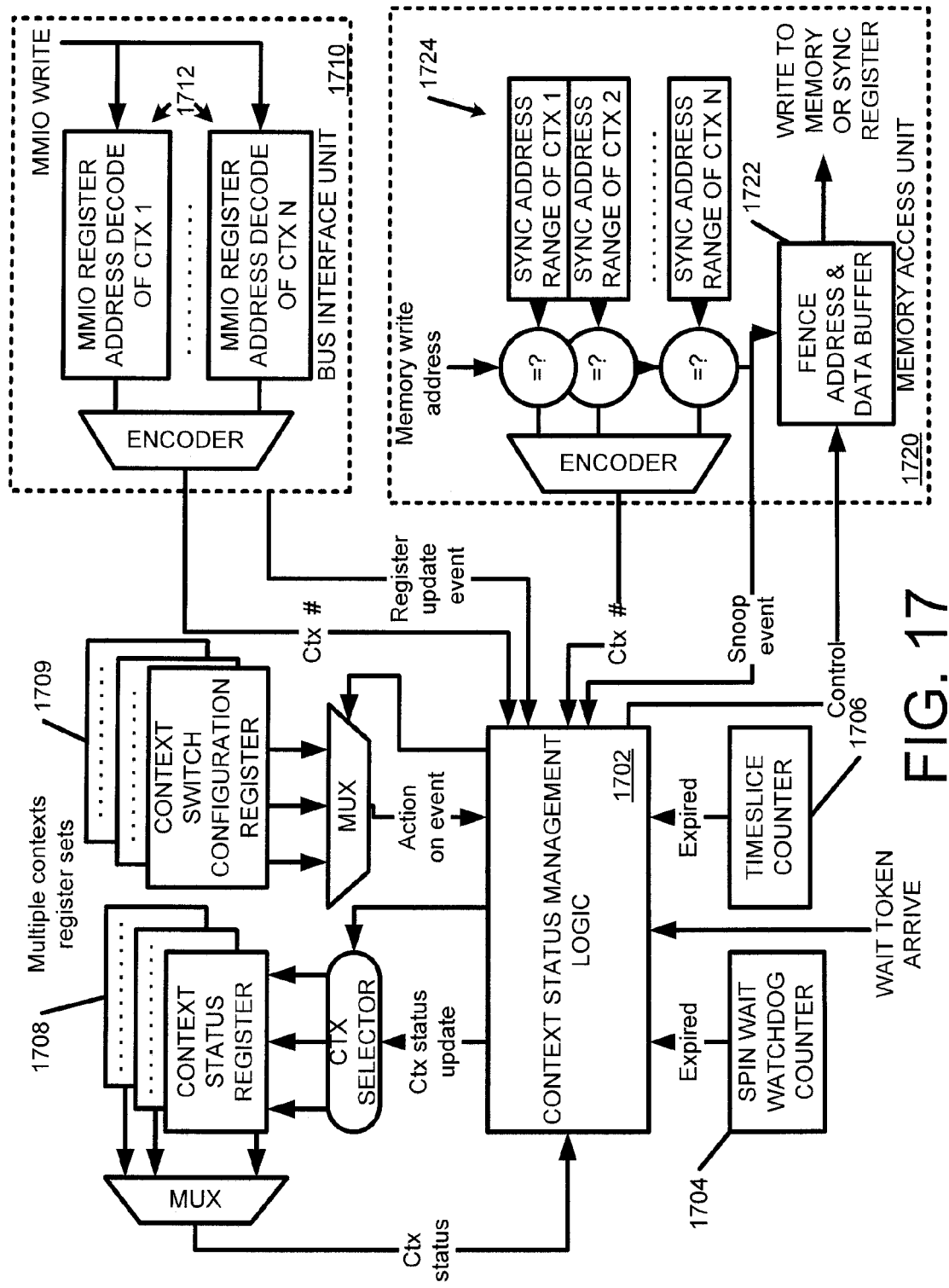
FIG. 17 is an exemplary implementation of context status management, sensitive to timer and snoop events.

FIG. 17 illustrates an exemplary implementation of context management in multiple context GPUs that is sensitive to timer and snoop events. Context status management logic block 1702 can be implemented as a dedicated hardware unit or as part of the functionality of a programmable RISC core, which can be used to support command stream processors. Context status management block 1702 can be configured to manage the status of currently running contexts as well as the status of other contexts mapped to an appropriate context register set. Context status management logic 1702 accepts signals from spin/wait and time slice watchdog timers 1704, a wait token arrival signal, and/or data from a time slice counter 1706. Context management logic 1702 may be configured to communicate with the currently running context registers, including context status registers 1708 and context switch configuration registers 1709. In case of a snoop or other event, the context management logic 1702 may select another context register set if this context receives the external access, which is snooped by comparison logic in memory access unit. Another type of snoop event may be generated by Bus Interface Unit (BIU) 1710 when external agent does write operation to a register space of one of the GPU contexts. MMIO register address decode logic 1712 may generate a signal that also can be converted to context number to communicate with context status management logic 1702. Context status register 1708 for event selected or current context may be read and updated according to the content of a context switch configuration register 1709, which contains action instructions for each type of event in particular context.

Also included in the nonlimiting example of FIG. 17 is a memory access unit 1720, which may include a fence address and data buffer 1722, configured to receive a snoop event and control data and write to memory and/or a sync register. To support non-blocking multiple fence writes, this buffer 1722 can be converted to the queue of FIFO type. Memory access unit 1720 may also include a sync address range related to one or more context 1724. This data can be sent, along with a memory write address to an encoder, which can encode the received data and send the data to context status management logic 1702.

Figure 18:
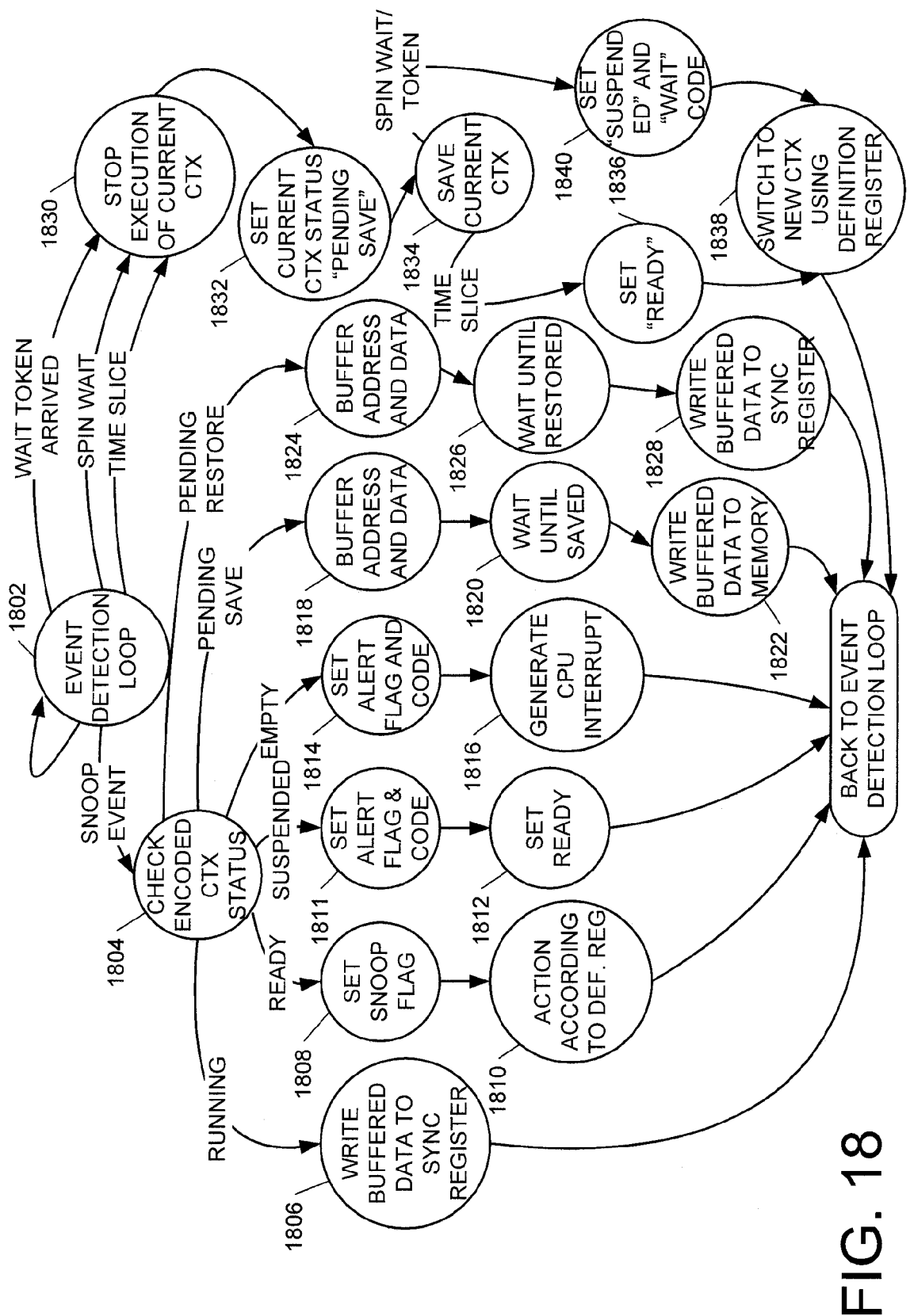
FIG. 18 is an exemplary state machine for context status management logic.

FIG. 18 is an exemplary state machine for context status management logic. As illustrated in this nonlimiting example, event detection loop (circle 1802) can continuously loop until an event is detected. If a snoop event is detected, the context status management logic can check the encoded context status (circle 1804). If the context is currently running, the context status management logic can write latched data to a sync register (circle 1806), and the context status management logic can return to event detection loop (circle 1802). If, at circle 1804, the context is in "ready" status, the context status management logic can set a snoop flag (circle 1808) and act according to a definition register (circle 1810). The process can then return to event detection loop (circle 1802).

If, at circle 1804, the context status management logic determines that the encoded context is in a suspended state, an alert flag and code can be set (circle 1811), and the context can be set to ready status (circle 1812). The process can then return to event detection loop. If, at circle 1804, the context status management logic determines that the encoded context is in an empty state, the alert flag and code can be set (circle 1814) and a CPU interrupt can be generated (circle 1816). If the context is in a pending save state, the context management logic can queue an address and data (circle 1818), wait until saved (circle 1820), and write queued data to memory (circle 1822). If the context is in a pending restore state, the context management logic can queue an address and data (circle 1824), wait until restored (circle 1826), and write queued data to a sync register (circle 1828). The process can then return to event detection loop (circle 1802).

If at event detection loop (circle 1802), a wait token arrives, a spin wait is detected, and/or a time slice is detected, execution of the current context can be halted (circle 1830) and the current status can be set to "pending save" (circle 1832). The current context can then be saved (circle 1834). If a time slice was detected, the context can be set to "ready" status, and the context management logic can switch to a new context using a definition register (circle 1838). If, after saving the current context (circle 1834) a spin wait or wait token is received, the context can be set to "suspended" and a "wait" code can be issued (circle 1840). The context management logic can then switch to a new context using a definition register (circle 1838). The process can then return to event detection loop (circle 1802).

One should note that the flowcharts included herein show the architecture, functionality, and operation of a possible implementation of software and/or hardware. In this regard, each block can be interpreted to represent a module, segment, or portion of code, logical component, which can be configured to execute at least one instructions for implementing the specified logical function(s). It should also be noted that in some alternative implementations, the functions noted in the blocks may occur out of the order. For example, two steps shown in succession may in fact be executed substantially concurrently or the blocks may sometimes be executed in the reverse order, depending upon the functionality involved.

One should also note that any of the logical steps listed herein, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

It should also be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A system for supporting a plurality of Graphics Processing Units (GPUs), comprising:
    a context status register configured to send data related to a status of at least one context;
    a context switch configuration register configured to send instructions related to at least one event for the at least one context;
    a context status management logic coupled to the context status register and the context switch configuration register, the context status management logic configured to receive the data related to a status of at least one context, the context status management logic further configured to receive the instructions from the context switch configuration register and perform an action according to the received instructions; and
    a memory access unit configured to send a snoop event signal to and receive control data from the context status management logic;
    a bus interface unit, the bus interface unit including logic for decoding an address of a context register and generate a register update event signal; and
    an encoder configured to generate a related context number to be sent to the context status management logic, wherein the encoder is further configured to define a context number subsequent to execution of a memory write operation.

2. The system of claim 1, wherein the context status register is further configured to hold and receive data related to a status of at least one context.

3. The system of claim 1, further comprising a spin wait watchdog counter configured to initiate a context switch event, in response to a down count expiration of the spin wait watchdog counter.

4. The system of claim 1, further comprising a time slice counter configured to initiate a context switch event, in response to time slice expiration.

5. The system of claim 1, wherein the memory access unit includes a plurality of sync address registers combined with a plurality of comparators, the plurality of sync address registers correspond to the at least one context, the comparators configured to receive a memory write address and generate a snoop event signal.

6. The system of claim 1, wherein the memory access unit is further configured to write data to at least one of the following: memory and a sync register block.

7. The method of claim 5, further comprising, in response to determining that the status is a running status, writing buffered data to a sync register block.

8. The method of claim 5, further comprising, in response to determining that the status is a ready status, setting a snoop flag and performing an action defined by an action definition register.

9. The method of claim 5, further comprising, in response to determining that the status is a suspended status, setting an alert flag and code and setting the context status to a ready status.

10. The method of claim 5, further comprising, in response to determining that the status is an empty status, setting an alert flag and code and generating a CPU interrupt command.

11. The method of claim 5, further comprising, in response to determining that the status is a pending save status, buffering an address and data and writing the buffered data to memory.

12. The method of claim 5, further comprising, in response to determining that the context status is a pending restore status, buffering an address and data and writing the buffered data to a sync register after the context has been restored.

13. A system for supporting a plurality of Graphics Processing Units (GPUs), comprising:
    a context status register configured to send data related to a status of at least one context;
    a context switch configuration register configured to send instructions related to at least one event for the at least one context;
    a context status management logic configured to receive the data related to a status of at least one context, the context status management logic further configured to receive the instructions from the context switch configuration register and perform an action according to the received instructions; and
    a memory access unit configured to send a snoop event signal to and receive control data from the context status management logic;
    a bus interface unit comprising logic for decoding an address of a context register and generate a register update event signal; and
    an encoder configured to generate a related context number to be sent to the context status management logic wherein the encoder is further configured to define a context number subsequent to execution of a memory write operation.

* * * * *